United States Patent
Pagni et al.

(10) Patent No.: US 7,243,213 B2
(45) Date of Patent: Jul. 10, 2007

(54) PROCESS FOR TRANSLATING INSTRUCTIONS FOR AN ARM-TYPE PROCESSOR INTO INSTRUCTIONS FOR A LX-TYPE PROCESSOR; RELATIVE TRANSLATOR DEVICE AND COMPUTER PROGRAM PRODUCT

(75) Inventors: Andrea Pagni, Milan (IT); Fabrizio Lucini, Ponte dell'Oglio (IT); Danilo Pietro Pau, Sesto San Giovanni (IT); Antonio Maria Borneo, Matera (IT); Vittorio Zaccaria, Milan (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 365 days.

(21) Appl. No.: 10/776,024

(22) Filed: Feb. 10, 2004

(65) Prior Publication Data

US 2004/0225869 A1 Nov. 11, 2004

(51) Int. Cl.
*G06F 9/455* (2006.01)
(52) U.S. Cl. .......................... 712/209; 712/24
(58) Field of Classification Search ................ 712/209, 712/24
See application file for complete search history.

(56) References Cited

U.S. PATENT DOCUMENTS 5,852,726 A * 12/1998 Lin et al. .................... 712/200
5,925,123 A * 7/1999 Tremblay et al. ........... 712/212
5,951,674 A * 9/1999 Moreno ....................... 712/210
6,496,922 B1 * 12/2002 Borrill ......................... 712/209
6,934,832 B1 * 8/2005 Van Dyke et al. .......... 712/244
2002/0138712 A1 * 9/2002 Yoshida ....................... 712/205

FOREIGN PATENT DOCUMENTS

EP        1 028 370 A2    8/2000
WO   WO 02/086699 A2   10/2002

OTHER PUBLICATIONS

IBM Corp., "Real-Time CISC Architecture HW Emulator on a RISC Processor," *IBM Technical Disclosure Bulletin 37* (3):605, Mar. 1994.

* cited by examiner

*Primary Examiner*—Eric Coleman
(74) *Attorney, Agent, or Firm*—Lisa K. Jorgenson; Robert Iannucci; Seed IP Law Group PLLC

(57) ABSTRACT

A procedure for translating ARM instructions of a first set into instructions of a second set for execution on an LX processor comprising a core provides a first set of registers corresponding to the ARM instructions and a second set of registers corresponding to the instructions that can be executed on the LX processor. Each register of the first set is mapped in a corresponding register of the second set designed to emulate the behavior of the first register, obtaining a unique independent translation of the first set into the second set. The translation is performed by a translation device external to the LX core without altering the core, and the translation operating without accessing resources of the core, by the translating device intercepting accesses of the core to the storage area reserved to the ARM instructions.

30 Claims, 1 Drawing Sheet

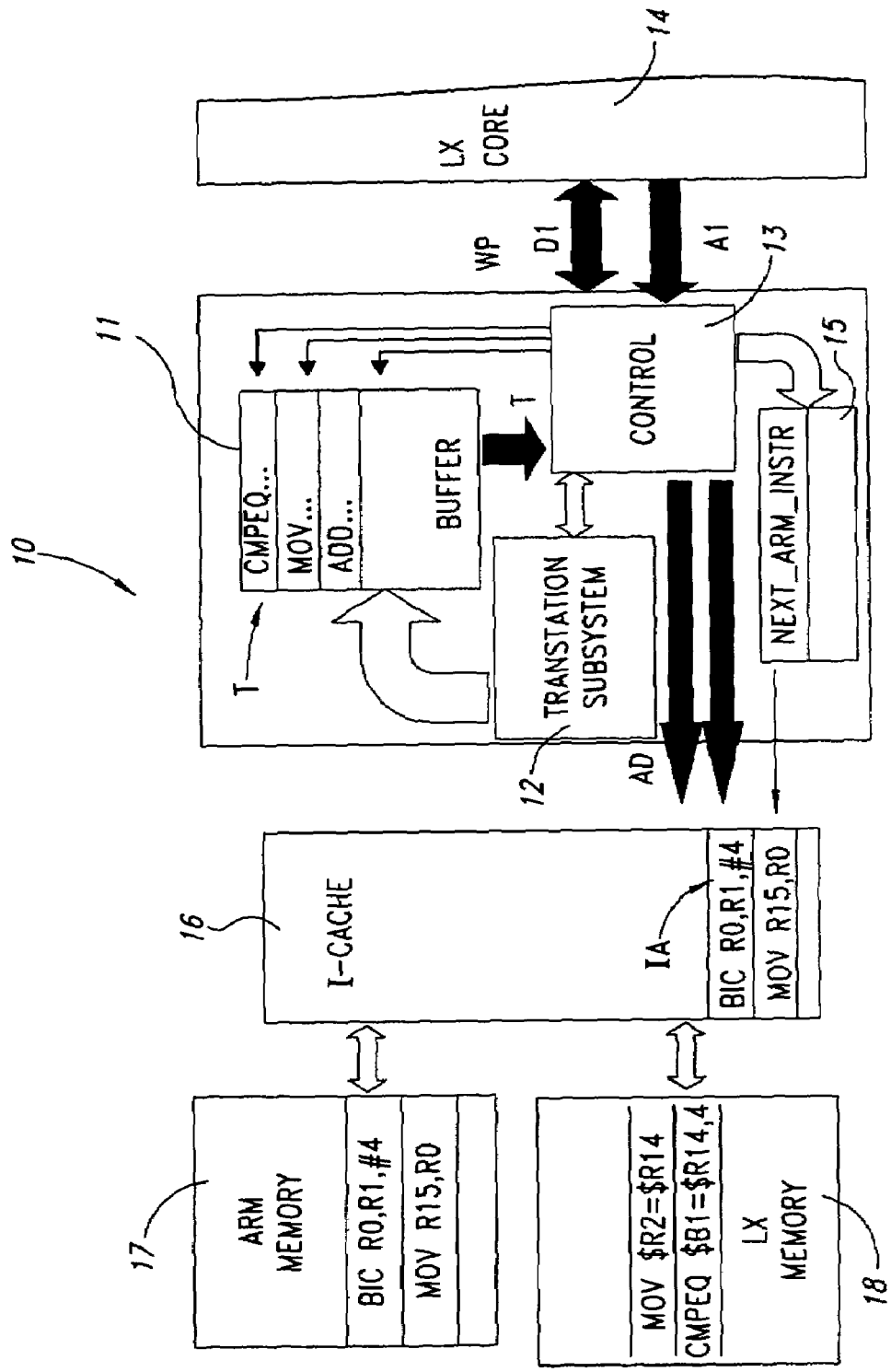

PROCESS FOR TRANSLATING INSTRUCTIONS FOR AN ARM-TYPE PROCESSOR INTO INSTRUCTIONS FOR A LX-TYPE PROCESSOR; RELATIVE TRANSLATOR DEVICE AND COMPUTER PROGRAM PRODUCT

BACKGROUND OF THE INVENTION

1. Field of the Invention

The present invention relates to the techniques for translating instructions that are to operate on different processors. The invention has been developed with particular reference to the possible application to the translation of instructions that can be executed on a processor of the ARM type into instructions that can be executed on a processor of the LX type, such as, for example, the microprocessor ST200-LX produced by STMicroelectronics, Srl, which is the assignee of the present application.

2. Description of the Related Art

An ARM microprocessor is typically a 32-bit pipelined scalar microprocessor, i.e., a microprocessor the internal architecture of which is constituted by different logic stages, each of which contains an instruction in a very specific state. Said state may be one of the following: loading of the instruction itself from the memory; decoding; addressing of a file of registers; execution; or writing/reading data from the memory. The number of bits refers to the width of the data and of the instructions on which the microprocessor operates. The instructions are generated in a specific order by compiling and executed in the same order. An LX microprocessor is typically a microprocessor of the type defined as very-long-instruction-word (VLIW) microprocessor, namely, a 128-bit pipelined VLIW microprocessor. A pipelined superscalar microprocessor possesses an internal architecture made up of different logic stages, some of which are able to execute instructions in parallel, for example in the execution step. Typically, the parallelism is of four instructions of 32 bits each (equal to 128 bits), whilst the data are expressed in 32 bits.

The processor is referred to as superscalar if the instructions are re-ordered dynamically in the execution step so as to supply the execution stages that may potentially work in parallel and if the instructions are not mutually dependent, thus altering the order generated statically by the compiling of the source code.

The processor is referred to as VLIW if, instead, the instructions are re-ordered statically during compiling and executed in the same fixed order, which cannot be modified in the execution step.

For more detailed information regarding the architecture of the microprocessors, reference may be made to the description given in the text: *Computer Organization & Design: The hardware/software interface*, D. A. Patterson & J. L. Hennessy, Morgan Kaufmann.

The ARM processor is a single-issue RISC machine, provided in any case with a sufficiently extensive set of addressing modes (the data-processing instructions support as many as nine different modes), and affords the possibility of conditional execution of all its instructions on the basis of the flags contained in the status register referred to as CPSR.

The LX processor is a four-issue VLIW processor, which in the sequel of the present description will always be illustrated in the single-cluster version. The LX processor, unlike the ARM processor, has only two addressing modes (from immediate and from register) and does not enable conditioned execution, but given the presence of four lanes operating in parallel, allows execution in parallel of a number of alternatives (with a maximum of 4 instructions) and then selection of the appropriate result once the condition on the execution has been evaluated.

The ARM microprocessor in the version 5, to which reference will be made hereinafter, possesses a 32-bit internal architecture that guarantees a 4-Gbyte address space and has 31 general-purpose registers, of which, however, only 16, designated by the references from R1 to R16, are accessible simultaneously.

There exist, in fact, seven different modes of operation necessary for handling the various types of exceptions to which the processor must respond:

| | |
|---|---|
| USER | normal execution mode |
| FIQ | fast interrupt control |
| IRW | generic interrupt control |
| SUPERVISOR | privileged mode for the operating system |
| ABORT | protection of access to memory and/or virtual memory |
| UNDEFINED | operating code not defined, for emulation of coprocessor |
| SYSTEM | privileged mode for particular operations of the operating system. |

Two of the 16 accessible registers have a particular role:
the register R15 is used as program counter (PC), i.e., it contains the address of the instruction to be executed;
the register R14 is used as link register (LR); i.e., it contains the address of the instruction to be executed following upon return from execution of a subroutine.

Furthermore, normally the register R13 is used by the software as stack pointer.

Two or more of the general-purpose registers are replicated for the various modes of operation in order to speed up handling of exceptions.

In the IRQ, Abort, Undefined and Supervisor modes, as compared to the User mode, only the registers R13 and R14 (i.e., link register and stack pointer) are replicated.

In the FIQ mode, to make the handling of the exception even faster, also the registers from R8 to R12 have been replicated.

The System mode, whilst presenting all the benefits of a privileged mode, sees all the same registers as the User mode.

Obviously, the program counter is not replicated in any of the modes.

In addition to the general-purpose registers, there is available a status register CPSR (the content of which is illustrated in Table 1) containing information on the result of the execution and on the mode of operation.

TABLE 1

| 31 | 30 | 29 | 28 | 27 | 26 | | 8 | 7 | 6 | 5 | 4 | | 0 |
|---|---|---|---|---|---|---|---|---|---|---|---|---|---|
| N | Z | C | V | Q | | (RAZ) | | I | F | T | | MODE | | where

N flag (negative flag): N=1 if the result of a operation is negative;

C flag (carry flag): C=1 if the result of an add operation generates carry or else if during the step of generation of the operands for a logic operation particular conditions have arisen; C=0 if the result of an operation of subtraction generates borrow;

V flag (overflow flag): V=1 if an arithmetic operation has generated overflow;

Z flag (zero flag): Z=1 if the result of an operation is zero;

Q flag: in the Extended versions Q=1 if the result of one of the operations of the group Enhanced DSP generates overflow or saturation.

The bits from 26 to 8 must not be modified and are read as zero.

I bit: if I=1, it disables the interrupt IRQ;

F bit: if F=1 it disables the interrupt FIQ;

T bit: if T=0 the processor is operating in the normal ARM mode; if T=1 the Thumb execution mode is active. In this mode, ARM interprets a reduced set of instructions, with operation codes, or opcodes, that occupy only 16 bits but with 32-bit register arithmetic, and sees simultaneously only 8 general-purpose registers.

The 5 least significant bits of the status register describe the mode of operation of the ARM processor, as may be seen from the following Table 2:

TABLE 2

| CPSR (4:0) | MODE |
|---|---|
| 0b10000 | USER |
| 0b10001 | FIQ |
| 0b10010 | IRQ |
| 0b10011 | SUPERVISOR |
| 0b10111 | ABORT |
| 0b11011 | UNDEFINED |
| 0b11111 | SYSTEM |

All the privileged modes, in addition to the register CPSR, then present a register SPSR, replicated for each mode. The register SPSR associated to a given mode is used for saving the status word contained in the register CPSR when the exception corresponding to that mode is raised; at the end of handling of the exception, the register CPSR will be restored with the value of the register SPSR. The instructions of the ARM processor may be classified in six groups:

data processing (addressing mode 1);

load&store word (32 bits) or unsigned byte (addressing mode 2);

load&store halfword (16 bits) or signed byte (addressing mode 3);

multiple load&store (addressing mode 4);

instructions for the coprocessors (addressing mode 5);

jumps.

The ARM processor enables the conditioned execution of almost all its instructions on the basis of the flags N, C, V, Z contained in the status register CPSR.

The condition is described in the four most significant bits of the opcode of the ARM processor.

Exceptions to the above are the instruction BLX (branch, link and exchange to Thumb state) and the instructions that refer to the coprocessors, which are not conditional.

The various combinations of the flags generate sixteen types of conditioned execution:

AL (always): the instruction is always executed);

NV (never): the instruction is never executed, is not defined, or else forms part of the non-conditional instructions referred to previously;

EQ(equal): Z=1;

NE (not equal): Z=0;

CS/HS (carry set—unsigned higher or same): C=1;

CC/LO (carry clear—unsigned lower): C=0;

MI (minus—negative): N=1;

PL (plus—positive or zero): N=0;

VS (overflow): V=1;

VC (no overflow): V=0;

HI (unsigned higher): C=1 and Z=0;

LS (unsigned lower or same): C=0 or Z=1;

GE (unsigned greater than or equal): N=V;

LT (signed less than): N!=V;

GT (signed greater than): Z=0 and N=V;

LE (signed less than or equal): Z=1 or N!=V.

There are eleven addressing modes of the ARM processor for the data-processing instructions:

Immediate;

direct from register;

logic shift to the left from register (the amount of the shift is contained in a register);

logic shift to the left from immediate (the amount of the shift is expressed by a 5-bit immediate contained in the opcode);

logic shift to the right from register;

logic shift to the right from immediate;

arithmetic shift to the right from register;

arithmetic shift to the right from immediate;

rotation to the right from register;

rotation to the right from immediate;

rotation through the carry flag.

The data-processing instructions are operations of a logic or arithmetic type that are executed by the 32-bit arithmetic logic unit (ALU) of the ARM processor.

The above operations can modify the value of the flags of the register CPSR on the basis of their result when the bit 20 (S bit) of the opcode is at a high level. The execution step of these operations always lasts just one clock cycle.

The ARM processor is then able to perform multiplications and multiplications-with-accumulation of numbers up to 32 bits, generating a 64-bit result that is split into two destination registers.

All the multiplication operations support only direct-from-register addressing, and their execution step lasts just one clock cycle, irrespective of the need or otherwise for performing the operation of accumulation at the end of the multiplication itself.

The operations of load&store in memory of Mode 2 act on words and unsigned bytes and support nine addressing modes, which in any case make use of a base register and a displacement:

base register +/− 12-bit immediate;

base register +/− offset register;

base register +/− scaled offset register (the offset register is shifted with modes similar to the data-processing instructions; the amount of the shift is described by an immediate);

base register +/− pre-indexed immediate (the base register is updated before accessing memory);

base register +/− pre-indexed offset register;

base register +/− pre-indexed scaled register;

base register +/− post-indexed immediate (the base register is updated after accessing memory);

base register +/− post-indexed offset register;

base register +/− post-indexed scaled register.

The operation of reading a 32-bit word from the memory does not require the address to be in itself word-aligned; the reading is made in any case, after which the word is rotated by 8, 16 or 24 if the address was not word-aligned but ended in 0b01, 0b10 or 0b11.

The operation of writing a word, instead, is self-aligned by ignoring completely the two least significant bits of the address; hence, it is not exactly the dual of the reading operation.

The operations of load&store in memory of Mode 3 act on halfwords and signed bytes and support only six of the nine addressing modes associated to Mode 2:

base register +/− 8-bit immediate;
base register +/− offset register;
base register +/− pre-indexed immediate;
base register +/− pre-indexed offset register;
base register +/− post-indexed immediate;
base register +/− post-indexed offset register.

Unlike what occurs in the case of the instructions of Mode 2, the reading and writing operations on halfwords (16 bits) entail the need for halfword-aligned addresses to be executed correctly.

The operations of multiple load&store of mode 4 contain within their opcode a 16-bit field that marks with a high-level bit the registers involved in the transfer.

The above operations present four addressing modes:

increment after: the list of registers is loaded into memory (for the store operations) or from the memory (for the load operations) starting from the address pointed to by a base register. The subsequent registers will be loaded into addresses obtained by incrementing by four (given that access is by words) the address of the previous access;

increment before: the basic address is first incremented by four and then used for the first access. The subsequent registers will be loaded into addresses obtained from the previous one by increment;

decrement after: as for increment after, but the next address is obtained by decrement;

decrement before: as for increment before, but the addresses are obtained by decrement.

The base register may optionally be updated at the end of the operation with the value of the next location pointed to if the bit 21 (W bit) of the opcode is at a high level.

There moreover exist instructions of multiple load&store which can be executed only in privileged operating mode and which enable loading of the program counter from the memory or accessing of the-general-purpose registers of the User mode.

The ARM processor then envisages a further two instructions that access the memory:

SWP: swap word;
SWPB: swap byte.

These instructions each access the memory twice, by loading into a first register the contents of a memory location pointed to by a base register and by writing in the same memory location the contents of a second register. If the first and the second register coincide, the contents of the register and of the memory location have been swapped.

The operations on the coprocessors of mode 5 comprise:
load from memory to coprocessor;
store from coprocessor to memory;
move from general-purpose register to coprocessor's register;
move from coprocessor's register to general-purpose register;
execute coprocessor's data-processing operation.

The instructions for the coprocessors are not described here. The ARM processor then envisages three jump instructions:

PC-relative conditioned jump (with and without storage of the return address): the 24-bit offset is contained in the opcode of the jump. To calculate the destination address, the offset is multiplied by four (in that each opcode of the ARM microprocessor occupies 32 bits) and extended with sign, and is then added to the current value of the program counter. It should be pointed out that, as a result of the architecture of the pipeline of the ARM processor, at the moment of updating, which takes place in the execution step, the program counter contains the address of the jump instruction incremented by eight;

unconditioned jump with change of mode: the processor performs a jump with 24-bit offset, stores the return address in the link register and enters Thumb mode, modifying the T bit of the status word;

conditioned jump with change of mode (with or without storage of the return address): the processor performs a jump to the address contained in an index register. The value of the index register is aligned by neglecting its least significant bit, which is used for deciding the mode of operation (if it is at a high level Thumb mode; otherwise ARM mode).

It is to be emphasized that, unlike the case of the LX processor, for the ARM processor the program counter forms part of the general-purpose registers; hence, any operation of data processing or of load from memory that will have R15 as destination register may generate a jump.

The commitment step of the operations that have the program counter as destination is therefore different from the normal load or data-processing instructions and must envisage restoring of the register CPSR with the value contained in the register SPSR associated to the current mode.

Two special instructions concern handling of the status registers:

MSR: moves an immediate or a general-purpose register of the current mode into one of the status registers of the current mode (CPSR or SPSR);

MRS: moves a status register of the current mode into a general-purpose register of the current mode.

The above instructions can be executed correctly only in a privileged execution mode and must not be used for modifying the T bit of the register CPSR, which would cause a transition from ARM mode to Thumb mode, or vice versa.

Accessing the register SPSR in the System mode, which does not see this register, has an unforeseeable effect on the execution.

There now follows a description of the architecture of the LX microprocessor.

The LX processor is a core with the possibility of assuming different configurations according to the use; in what follows, reference will be made to the 4-issue single-cluster version.

The entire architecture is 32-bit and has 64 general-purpose registers plus a program counter not accessible directly by the user.

Two of the general-purpose registers have, however, particular functions:

the register R63 is used as link register;
the register R0 contains always the value zero and is used for comparisons and assignments that cannot use explicitly a further immediate field, as will be clarified in what follows.

There then exists a series of special registers (always 32-bit ones) mapped in a reserved area that occupies the last 4 Kbytes of the address space of the LX processor, which is of 4 Gbytes.

These registers, among other things, comprise:

a status register PSW, which contains the mode of operation (either User or Supervisor) and information on the devices for the protection and management of the memory;

a stack register for the status register, used in the presence of exceptions;

a HANDLER_PC register, used in the presence of exceptions for containing the address of the exception handler;

other registers that contain information required for recognition and management of the exceptions;

registers for control of the protection unit for the program memory (IPU) and data memory (DPU).

In each cluster of the LX processor there are therefore four lanes, to each of which there is associated an ALU capable of executing the normal 32-bit logic-arithmetic operations. There are then two units capable of making the multiplications of a 16-bit number with a 32-bit number, with result truncated at 32 bits. These units are associated to lanes 1 and 3 of the cluster.

The LX processor enables just one access to memory for each cluster; hence, there exists a single Load&Store unit, which is able to execute operations on words, halfwords, or bytes and which may be associated to any one of the lanes of the cluster.

A unit referred to as Instruction Issue Unit allocates the operations contained in one and the same bundle or set of instructions on the lanes in such a way that the two least significant bits of the word address of each instruction determine the lane on which the instruction itself is run.

A direct consequence of this is that a multiplication instruction, which must be executed on an odd lane, must occupy an odd word address in the program memory. It is therefore necessary to make the alignment by inserting into the code, if necessary, NOP (no operation) instructions.

In each cluster there is then present a unit referred to as branch unit, which executes the jump operations. The LX processor performs the conditioned-jump operations on the basis of one of the branch-bit registers, a group of eight registers of one bit each, which contain the result of logic operations or comparison operations.

The value of a branch-bit register must be assigned at least two bundles before the corresponding conditioned jump occurs.

All the jump operations must occupy the first instruction of the bundle, and there cannot be two jump instructions within the same bundle, even if the two constructs are alternative.

The LX processor has just two addressing modes for the data-processing instructions:

from register;

from immediate.

The immediates may, however, be of two types: short and long.

The short immediates are 9-bit signed numbers, which are able to represent a number from −128 to +128 and are incorporated into the 32 bits of the opcode.

The long immediates are 32-bit signed numbers and occupy with the 9 least significant bits part of the 32 bits of the opcode. The remaining 23 bits are contained in one of the words adjacent to the opcode, with the constraint of being associated to lane 0 or lane 2 of the cluster, and hence occupying an even word address.

The operations of access to the memory enable only addressing by means of the base register plus 9-bit offset and, unlike what occurs in the case of the ARM processor, they involve alignment.

Accesses to words on addresses that are not word-aligned, as well as accesses to non-halfword-aligned halfwords, generate exceptions.

As regards the jump instructions, mention of which has already been made previously, there are conditioned-jump operations (BR, BRF), which make offset jumps (23-bit) and unconditioned-jump instructions (CALL, GOTO, RTI), which can make offset jumps (23-bit) or else jumps to the address pointed to by the link register, with the constraint that the link register must be modified at least three bundles before the corresponding jump.

There are then two instructions (SLCT, SLCTF), which enable a conditional MOV operation to be performed on the basis of the evaluation of a branch bit: if this has a high level, the first source register is brought into the destination register; otherwise, the second source register or an immediate is loaded according to the addressing mode.

Finally, it should be emphasized that the LX processor, unlike the ARM processor, does not contain a register of the flags, and that hence it is not able to point out automatically whether the arithmetic operations generate carry or overflow.

Already known to the art are various solutions that aim at enabling a given microprocessor to execute instructions of a set originally designed for a different processor.

For example, the European patent application EP-A-0 747 808 describes a dual-instruction-set processor that is able to interpret both the native code of an IBM PowerPC computer and the code for the Intel x86 family of processors.

The above-mentioned document describes the management of the system of virtual memory necessary for enabling multitasking of two applications developed for different instruction sets, but does not describe a translation process.

To carry out an efficient translation of the x86 instructions, the original structure of the PowerPC is extended with instructions and registers dedicated to the execution in x86 mode.

The issue logic of the core is moreover modified by the addition of units for decoding and translating x86 opcodes. These units work in parallel with the native decoding unit of the PowerPC, and on the basis of the current operating mode the choice is made as to which of the two decodings is to be applied. To enable determination of the operating mode of the processor, there is added a Control Unit Mode, which is responsible for handling switching between the x86 mode and the PowerPC mode.

The above unit is able to interact with the Memory Management Unit to enable a proper management of the system of virtual memory.

BRIEF SUMMARY OF THE INVENTION

From an analysis of the two sets of instructions of the ARM processor and the LX processor, it emerges how only a minimal part of the instructions of the ARM microprocessor corresponds to a single instruction of the LX microprocessor, on account of the possibility of conditional execution, the variety of the addressing modes of the ARM processor, the different modes of memory access, and the lack, on the LX, of a status register. Such an expansion of the code of the ARM processor in the translation step has an immediate repercussion on the possibility of emulating the behaviour of an ARM processor on the LX microprocessor and on the possible creation of a device that carries out translation.

An embodiment of the present invention provides a solution that will enable the instructions that can be executed on an ARM processor to be translated into instructions that can be executed on an LX processor.

One embodiment of the invention also regards the corresponding translator device, as well as the corresponding computer program product, directly loadable into the memory of a digital computer, such as a processor and which comprises software code portions for performing the procedure according to the invention when the product is run on a computer.

The solution according to the invention, which has been developed with specific reference to the translation of ARM instructions into LX instructions, may in actual fact be applied to a wider field of use, namely to the translation of instructions of a pipelined scalar microprocessor that has characteristics which, in any case, can be correlated to the characteristics of an ARM processor, into instructions for a VLIW microprocessor that has characteristics which, in any case, can be correlated to the characteristics of an LX processor.

This concept is expressed in what follows, and in particular in the claims that follow, making reference to "ARM type" processors and "LX type" processors.

One embodiment of the invention envisages mapping each register of the ARM microprocessor on a register of the LX microprocessor, which is designed to emulate the behaviour of the former register, performing the translation in the absence of direct access to the resources of the core of said LX microprocessor.

BRIEF DESCRIPTION OF THE DRAWINGS

The invention will now be described purely by way of non-limiting example, with reference to the annexed drawings, which comprise a single FIGURE that represents a block diagram of a translator device operating according to one embodiment of the invention.

DETAILED DESCRIPTION OF THE INVENTION

The basic principles of the translation technique described herein, which corresponds to the currently preferred embodiment of the invention, are the following:
  mapping each register of the ARM microprocessor, including the replicated registers and all the status registers, on a register of the LX microprocessor that will emulate the behaviour of the corresponding register of the ARM microprocessor;
  not modifying the core of the LX microprocessor by adding functional units for covering part of the instruction set or of the addressing modes of the ARM microprocessor currently not covered by the LX microprocessor;
  having a unique translation of the instructions of the ARM microprocessor which is not data-dependent;
  never accessing the resources of the core of the LX microprocessor directly before or during the translation step.

In particular, the solution according to the invention, in its currently preferred embodiment is distinguished with respect to the known solutions for different reasons:
  the core of the LX microprocessor is not in any way modified for interpreting the code of the ARM microprocessor, but an external translating device is added, set between said core and the cache;
  the translating device, when it needs to access the resources of the core of the LX microprocessor, does not access them directly but incorporates in the translation of the ARM instruction conditional constructs that are based upon the contents of the registers or of the branch bits of the core of the LX microprocessor (see, for example, in the ensuing description, the method whereby the current operating mode of the ARM processor is determined for the instructions MRS and MSR);
  the translating device goes into action autonomously, recognizing the accesses to the storage area reserved to the ARM code, without any need for explicit switching operations or for a Mode Control Unit;
  the ARM instructions are translated into LX instructions, which are then decoded by the issue logic of the LX microprocessor, which is kept unaltered. Instead, in the document EP-A-707 848 cited above, the x86 instructions are decoded to control directly the resources of the core.

By physically mapping all the registers of the ARM processor, including the replicated registers and the status registers, on the registers of the LX processor, there is then emulated also the behaviour of the program counter of the ARM processor.

The operation of mapping of the ARM registers and of the other registers that are required for translation on the LX registers is described in Table 3 appearing below.

TABLE 3

| | |
|---|---|
| R0: always zero | R32: ARM_R13spv |
| R1: Rtemp 1(temporary storage) | R33: ARM_R14spv |
| R2: Rtemp 2 (temporary storage) | R34: ARM_13irq |
| R3: Rtemp3 (temporary storage) | R35: ARM_R13irq |
| R4: Rtemp4 (temporary storage) | R36: ARM_R13abt |
| R5: Rtemp5 (temporary storage) | R37: ARM_R13abt |
| R6: Rtemp6 (temporary storage) | R38: ARM_R13und |
| R7: Rtemp7 ((temporary storage) | R39: ARM_R13und |
| R8: Rtemp8 (temporary storage) | R40: ARM_R8stack |
| R9: Rt_dest(temporary destination) | R41: ARM_R9stack |
| R10: Rshift_op (2nd operand) | R42: ARM_R10stack |
| R11: RN (negative flag) | R43: ARM_R11stack |
| R12: LX stack pointer | R44: ARM_R12stack |
| R13: RC (carry flag) | R45: ARM_R13stack |
| R14: RV (overflow flag) | R46: ARM_R14stack |
| R15: RZ (zero flag) | R47: not used |
| R16: ARM_R0 | R48: ARM_CPSR (status register) |
| R17: ARM_R1 | R49: ARM_SPSRspv (status register) |
| R18: ARM_R2 | R50: ARM_SPSRirq (status register) |
| R19: ARM_R3 | R51: ARM_SPSRfiq (status register) |
| R20: ARM_R4 | R52: ARM_SPSRund (status register) |
| R21: ARM_R5 | R53: ARM_SPSRabt (status register) |
| R22: ARM_R6 | R54: ARM_R13fiq |
| R23: ARM_R7 | R55: ARM_RI3fiq |
| R24: ARM_R8 | R56: RtN (temporary negative flag) |
| R25: ARM_R9 | R57: RtZ (temporary zero flag) |
| R26: ARM_R10 | R58: RtC (temporary carry flag) |
| R27: ARM_R11 | R59: RtV (temporary overflow flag) |
| R28: ARM_R12 | R60: not used |
| R29: ARM_R13 (stack pointer) | R61: not used |
| R30: ARM_R14 (link register) | R62: not used |
| R31: ARM_R15/ARM_PC | R63: LX link register |

Designated by PC is the program counter of the LX processor.

To guarantee proper execution of a program for an ARM microprocessor on an LX microprocessor, a first solution proposed is that of forcing the program counter of the LX microprocessor to emulate the operation of the program counter of the ARM microprocessor.

According to this approach, upon loading an ARM instruction, the program counter of the LX processor must contain exactly the same value as the program counter of the ARM processor, but the LX processor finds itself, in the vast majority of cases, having to execute more than one instruction to emulate the behaviour of the ARM processor, so that at the end of the execution of the emulated instruction it will be necessary to jump to the address of the next ARM instruction, in order to be able to load the next instruction.

In the meantime, a further register ARM_R15/ARM_PC, which emulates the program counter of the ARM processor, indicated in Table 3, will first have to be incremented by eight so that each instruction that accesses it during its execution step will present a behaviour coherent with the execution on the pipeline of the ARM processor, and then decremented by four to point to the next ARM instruction in memory.

Exceptions to the above will of course be the ARM instructions that have as destination register the program counter, for which the loading of the next ARM instruction will take place by loading, in the link register of the LX processor, the updated value of the register ARM_PC and by making an unconditioned jump of the GOTO-link type.

To carry out what is described above, the translation of the ARM instructions is entrusted to a device set outside the LX core, which intercepts the accesses to the storage area reserved to the ARM code, translating all the instructions that do not have a single equivalent LX instruction into an unconditioned jump of a GOTO type and forcing the program counter of the LX processor to point to a reserved storage area for containing the translation of the ARM instruction that in the meantime is decoded.

Into this translation buffer, the device will load all the bundles that constitute the LX translation of the decoded ARM instruction. As has already been said, the last bundle of the translation must contain a jump-to-link to the next ARM instruction to be executed.

In this way, all the ARM instructions that are not directly mappable on an LX instruction entail a jump to the translation area and a jump-to-link for loading the next ARM-instruction. Given that to make an LX jump-to-link it is necessary for the link register to be modified at least three bundles before the corresponding jump, the impact of these two jumps on the duration of execution of the ARM program is considerable.

For this reason, a second solution is proposed, which envisages not forcing the program counter of the LX processor to follow the operation of the program counter of the ARM processor, in this way enabling saving of the jump to the translation area and making the jump with final link only if the ARM instruction really does make a jump.

In addition to speeding up execution of the ARM program, this second solution enables saving on the number of LX instructions executed in parallel and consequently reducing the waste of power by the core with respect to the previously proposed solution.

In the absence of jumps, the program counter of the LX processor is left to evolve freely.

Whilst in the first solution if the LX program counter exits the memory space in which the ARM instructions reside it is certain that the native LX instructions will be executed, in the second solution the translating device must intercept all the accesses of the core to the memory instructions and control the pointer register to decide whether to execute the subsequent instructions as native LX or as ARM to be emulated. The pointer register resides in the translating device illustrated in FIG. 1, which is set between the instruction cache and the core of the LX processor and the operation of which will be described in greater detail in what follows.

FIG. 1 therefore shows a schematic circuit diagram of the translation device. The said translation device is designated by 10 and comprises a translation buffer 11, a translation subsystem 12 associated with a microcode table, and a control unit 13 for controlling the translation device.

The translation device 10 is set between a core 14 of the LX processor and a memory cache for the instructions 16, which executes its own caching function on two areas of memory, a RAM memory 17 for the ARM instructions and a RAM memory 18 for the LX instructions.

The translation device 10 therefore, which is set outside the core 14, intercepts the accesses of the core 14 to the memory, in particular to the storage area reserved to the ARM code constituted by the RAM 17. In fact, the translation device 10 exchanges data by means of said control unit 13 with the core 14 of the LX processor and receives the addresses on respective data-signal lines D1 and address-signal lines A1.

The control unit 13 is then connected by means of an address-and-data bus AD to the instruction cache memory 16, the pointer of which is comprised in a set of pointer registers designated by 15 and comprised in the translation device 10.

In the memory 17 it is possible to note an ARM instruction to be translated, designated by IA in the I-cache 16, by way of example the instruction BIC.

It is to be noted at this point that, whilst in the first solution, which envisages forcing the program counter of the LX processor if said program counter exits from the memory space in which the ARM instructions reside it is certain that native LX instructions will be executed, in the second solution the translating device 10 must intercept all the accesses of the core to the memory instructions and check the pointer register 15 to decide whether to execute the next instructions as native LX or as ARM to be emulated. The pointer register 15, as described above, resides in the translating device 10, which is set between the memory cache 16 and the core 14 of the LX processor Upon resetting of the LX processor of which it forms part, the translating device 10 is inactive and sends back the accesses-to-memory to the underlying devices, typically to the instruction cache 16. This is the condition in which the translating device 10 works until the core 14 executes a normal LX code (with instructions belonging to the instruction set of the LX processor).

When there is an access to the storage area reserved for containing the ARM code, i.e., the memory 17, for example an access to the instruction IA, the translating device 10 is activated, loads the address that is accessed into one of its internal registers in the pointer register 15, designated by NEXT_ARM_INSTR in FIG. 1, and carries out reading of the instruction to be translated IA into ARM code from the storage area in the corresponding memory 17. The register NEXT_ARM_INSTR has, that is, the function of ARM instruction pointer.

The instruction IA read is translated by the translation subsystem 12, which makes use of a microcode table in the corresponding equivalent set of LX instructions, designated in FIG. 1 as translation T, and stored in the translation buffer 11. The translation device 10 then allocates "above" the ARM instruction an execution window to which will be sent back all the accesses to memory addresses that start from the current value of the program counter of the LX processor and cover an area equal to the one occupied by the translation.

The core 14 of the LX processor may thus read the first instruction of the translation T from the buffer 11, which sends it to the control unit 13, and the device 10 increments the register NEXT_ARM_INSTR by four to point to the next ARM instruction of the translation. In the presence of jumps in the program in ARM code, the register NEXT_ARM_INSTR must be rewritten explicitly by means of a store-word operation contained in the LX translation of the ARM instruction.

Once the last instruction of the translation T has been read, the execution window closes and, if at the next access to memory the register NEXT_ARM_INSTR points outside the storage area reserved to the ARM code, the translation device 10 is deactivated.

The control unit of the device 13 checks activation of the translation device 10, activates the translation subsystem in block 12 to allocate and manage the execution window by means of the appropriate internal pointer registers that supply window pointers designated by WP in FIG. 1, and to propagate the accesses-to-memory by the core 14 to the memory system consisting of the RAM memories 17 and 18.

Of the instruction set of the ARM processor those instructions the execution of which depends directly upon the hardware of the peripherals or of the memory system of the specific ARM processor cannot be translated.

These instructions comprise:
software interrupts;
breakpoints;
instructions for the management of the coprocessors;
accesses-to-memory with the T option: these operations interact with the memory, accessing the latter in User mode regardless of the actual current mode of the processor. The ARM core has, in fact, a line that enables the memory to know with what attributes (user or privileged) to access the memory.

There now follows a detailed description of the procedure of translation of the ARM instructions into LX instructions.

For this purpose, a pseudo-code will be used for describing the instructions.

The description in pseudo-code of the translation of each ARM instruction uses a C-like syntax.

The only extensions to the traditional C syntax are the following:

Since the LX processor is a VLIW machine, to highlight the parallelism at the instruction level, each bundle, i.e., the set of LX instructions that can be executed in parallel in the same cycle, has been delimited by a dashed line;

all the operations of assignment within a bundle must be considered executed simultaneously: the order in which the instructions are written within one and the same bundle of the pseudo-code is irrelevant, and it is not the one actually used on the LX processor that imposes constraints in the positioning of multiplications and long immediates (i.e., ones of more than 9 bits);

the Boolean variables stored in the branch-bit registers of the LX processor are designated as $<variable_name>;

the immediates (numeric constants dependent upon the opcode of the instruction), generated directly by the translation logic on the basis of the contents of the ARM opcode, are indicated in the code executed by LX as #<immediate_name>;

the list of the operations carried out by the translating device for generating these values is described in the boxes with dashed borders set to the right of the LX translation;

all the LX opcodes that make use of long immediates occupy in effect two consecutive words in the LX bundle. The following instructions are not indicated in the pseudo-code:

the operator ASR (arithmetic shift right) symbolizes the arithmetic shift to the left;

the operator ROR (rotate right) symbolizes the rotation to the right;

the macros 16 lsb_of(<register>) and 16 msb_of(<register>) indicate, respectively, extraction of the 16 least significant bits and extraction of the 16 most significant bits from a register. The remaining 16 bits are filled with zeros;

the macro Mask(<fields>) generates, on the basis of the 4-bit mask <fields> contained in the opcode, the masks for modification of the status registers for the instruction MSR;

the operations of access to memory are described by the macros: MemoryWord(<address>), MemoryByte<address>), MemoryUByte(<address>), MemorySByte(<address>). In particular, MemorySByte represents reading from the memory to the address <address> of a byte that is extended with sign. MemoryUByte represents the reading of an unsigned byte;

in the representation of the instructions, the character @ is used as jolly. For example ADD@@ represents all the ARM instructions of adding, such as, for example, ADDEQ (add if equal) or ADDNE (add if different), or else ARM_R@ represents any one of the LX registers that emulate the general-purpose registers of the ARM processor, such as ARM_R1 or ARM_R12.

As already described previously, the ARM processor enables the conditioned execution of the instructions on the basis of the flags contained in the status register CPSR.

The condition is described in the four most significant bits of the ARM opcode.

Exceptions to this rule are the instruction BLX (branch, link and exchange to Thumb state) and the instructions that refer to the coprocessors, which are not conditional.

Furthermore, the translation of the instructions for the coprocessors is not described here in that, for their correct operation, the presence is indispensable in the system based upon the LX core of devices that emulate correctly the coprocessors of the ARM processor, here not available.

Also from the point of view of the translation, it is possible to divide the ARM instructions into the five following groups:
data processing;
multiplications;
single load&store;
multiple load&store;
jumps.

For all five categories, the translation on the LX processor of the operation starts with the verification of the execution condition, which consists in the evaluation of one or more of the flags present in the status register. There are four such flags:

N flag (negative flag): N=1 if the result of an operation is negative;

C flag (carry flag): C is forced to 1 if the result of a logic operation or of an addition generates carry, to 0 if the result of a subtraction generates borrow;

V flag (overflow flag): V=1 if an arithmetic operation has generated overflow;

Z flag (zero flag): Z=1 if the result of an operation is zero.

The various combinations of these flags generate the sixteen types of conditioned execution AL, NV, EQ, NE, CS/HS, CC/LO, MI, PL, VS, VC, HI, LS, GE, LT, GT, LE.

The LX processor, which does not support the conditioned execution, must carry out the appropriate tests for evaluating whether the execution condition is verified, after which the instruction to be executed can be translated.

The positive evaluation determines the setting of one of the branch bits of-the LX processor (namely, the branch bit 7), which is used for a predicated execution of the instruction or, in the case of instructions that cannot be executed in a speculative manner, such as for example load&store instructions, for jumping to the next ARM instruction.

To speed up modification of the flags on the basis of the result of the multiplication and data-processing operations, each of the four flags C, Z, N, V is calculated and stored in a special register of the LX processor. The said four registers are designated by RC, RZ, RN, RV in Table 3.

The said set of registers RC, RZ, RN, RV is read for evaluating the condition of execution of the subsequent ARM instructions. The register ARM_CPSR on the LX processor that emulates the behaviour of the register CPSR is hence not updated at each instruction that modifies it but only when there occurs a reading operation thereon, so that the value read will be coherent with the one read in the normal execution of the same program on the ARM processor.

In the step of translation of the condition, the value of the LX register that emulates the ARM program counter is moreover incremented by eight, so that during the subsequent steps of the operation each access to said register will see the updated value, coherently with the behaviour of the ARM processor.

The translation of the ARM instructions is described in a pseudo-code, the syntax of which is described in detail hereinafter.

For example, when an ARM instruction with execution condition GE (unsigned greater or equal) is encountered, the first bundle of the LX translation will be:

| ARM instruction | LX translation |
| --- | --- |
| @@@GE Rdest,Rsorg1, Rsorg2 | $Condition = (RN= =RV) |
| | ARM_PC = ARM_PC + 8 |

When the execution condition is, for example, LE (signed less or equal) and cannot be evaluated instantaneously but it is necessary to combine the results of the two comparisons Z=1 and N!=V, two bundles will be necessary for making the evaluation.

For the data-processing operations, once the condition has been translated, it is necessary to translate the addressing mode.

The addressing modes of the ARM processor for data-processing instructions, as described previously, are nine:
immediate, direct from register, logic shift to the left from register, logic shift to the left from immediate, logic shift to the right from register, logic shift to the right from immediate, arithmetic shift to the right from register, arithmetic shift to the right from immediate, rotation to the right from register, rotation to the right from immediate, and rotation through the carry flag.

In this step, the last bit at output from the source register following upon the shift operation must also be evaluated. This bit will be used for updating the value of the carry flag for those logic operations that require commitment and, in this step, is stored in a special temporary register awaiting a decision, based upon the opcode, as to whether the status register CPSR must be updated.

In the case of addressing from immediate, it is necessary to check whether a rotation has to be made on the 8-bit immediate contained in the least significant byte of the ARM opcode. The immediate field of the ARM opcode is 12 bits long and contains in the four most significant bits a value, designated by amt, which describes the rotation to the right to be applied on the 8-bit immediate, designated by imm.

Said 4-bit value amt must be multiplied by two to know by how many positions it is necessary to rotate the immediate to the right.

If said value is equal to zero, the rotation is not necessary, but it is necessary only to shift the immediate into a special temporary register, designated by Rshift_op in FIG. 1 for the next translation of the execution step of the opcode to be unique. The value of the carry flag is not altered by this addressing mode, so that in the temporary carry register, RtC in Table 3, all that needs to be done is to write the contents of the carry register RC.

| ARM instruction | LX translation |
| --- | --- |
| @@@ Rdest.Rsorg1, imm | Condition Evaluation |
| | Rshift_op = #imm |
| | RtC = RC |

If, instead, the rotation is necessary, this must be performed on the LX processor, which does not have rotation operations in its instruction set, as a series of shifts and logic ORs. The value of the carry must be updated with the last value coming from the register Rshift_op as a result of the rotation to the right (which is also the MSB of the rotated immediate).

The direct-from-register addressing is encoded in the ARM opcode as a particular case of addressing with logic shift to the left from immediate when the immediate is equal to zero. Its translation, like the addressing from immediate, consists only in moving, in the register Rshift_op, the contents of the source register, whilst the carry does not need to be modified.

There now follows an analysis of the modes of addressing from register scaled with the amount of the shift expressed by an immediate.

Logic shift to the left from immediate: the amount of the shift is expressed by a 5-bit immediate contained in the opcode. In addition to carrying out the shift of the source register, it is necessary to carry out the complementary logic shift to the right for updating the carry. With just the shift, the temporary carry register RtC would not be updated correctly, because its LSB will contain the value with which the flag is to be updated, but other bits of the register may have non-zero content. It will be necessary, in the subsequent steps of the translation, to set to zero all the other bits of the register RtC by means of a logic AND operation.

Logic shift to the right from immediate: this is analogous to the previous case, but the carry flag must be updated with the last bit coming from the register Rshift_op following upon the operation of shift to the right.

Arithmetic shift to the right from immediate: this is analogous to the previous case, with the particularity that if the amount of the shift is zero, an arithmetic shift of 31 positions is made, i.e., just the sign of the contents of the register Rsorg2 is kept in the register.

Rotation to the right from immediate: as already mentioned, the LX processor does not have a rotation instruction; hence the rotation must be made as a series of shifts and logic ORs.

The carry flag is to be updated with the last bit coming from the register Rsorg2 following upon a rotation to the right.

Logic shift to the right from register: this is analogous to the previous case, but if the amount of the shift is not zero the carry flag must be updated with the last bit coming from Rshift_op following upon the operation of shift to the right.

Arithmetic shift to the right from register: this is altogether analogous to the previous case, with the only difference that the two shifts must of course be arithmetic and not logic.

Rotation to the right from register: if the value is zero it must not have any effect. Otherwise, it is necessary to make the rotation and update the carry flag with the last bit coming from the register Rsorg2 following upon the shift to the right.

For the rotation to be made correctly by means of the shift, if the amount of the rotation is greater than or equal to 31 it is necessary to truncate (a rotation to the right of 35 positions is in fact equivalent to a rotation of 3). It is, in any case, necessary to distinguish the cases of rotation of zeros from the rotation of multiples of 32, because in the second case the carry flag must be updated.

Once the operand has been obtained, which is always stored in the special register Rshift_op, the part of execution of the ARM opcode is translated.

Among the data-processing instructions there are 8 logic instructions and 8 arithmetic instructions.

The logic instructions are:
AND (logic AND);
EOR (exclusive OR);
ORR (inclusive OR);
BIC (bit clear);
MOV (move to register);
MVN (move negated);
TST (test: updates the flags as a result of a logic AND);
TEQ (test equivalence: updates the flags as a result of an exclusive OR).

These instructions do not modify the overflow flag and update the carry flag on the basis of the previous step of rendering available the operand, as described previously.

The test operations, unlike the other operations, do not modify the contents of any general-purpose register but only the flags of the register CPSR.

The arithmetic instructions are:
ADD (addition);
ADC (addition with carry);
SUB (subtraction: subtracts the value of the shifter-operand from that of a register);
RSB (reverse subtract: subtracts the value of a register from that of the shifter-operand);
SBC (subtraction with borrow);
RSC (reverse subtract with borrow);
CMP (compare: updates the flags as a result of the subtraction between the two operands);
CMN (compare negated: updates the flags as a result of the addition of the two operands);

These instructions modify the overflow flag and the carry flag according to the result.

The evaluation of these two flags is different for addition and for subtraction and is made in the next commitment step.

The compare operations, unlike the others, do not modify the contents of any general-purpose register but only the flags of the register CPSR.

Seeing that all the data-processing operations can support the conditional execution, the result of the execution is stored in a temporary destination register designated as Rt_dest in Table 3.

As example of instruction logic of the ARM processor, the part of execution of the instruction BIC (bit clear) is translated as follows:

| ARM instruction | LX translation |
|---|---|
| BIC @ @ Rdest,Rsorg1 @ @ @ | Condition Evaluation |
| | 2$^{nd}$ Operand Generation |
| | Rtemp1 = Rsorg1+Rshift_op |
| | Rt_dest = Rtemp1 + RC |

Note how the high bits of the temporary carry register RtC are set to zero in this step of the translation, given that, in the previous step of generation of the second operand, said register may have been updated simply with a shift operation.

As example of an arithmetic operation, consider the instruction ADC(add with carry):

| ARM instruction | LX translation |
|---|---|
| ADC @ @ Rdest,Rsorg1, @ @ @ | Condition Evaluation |
| | 2$^{nd}$ Operand Generation |
| | Rtemp1 = Rsorg1+Rshift_op |
| | Rt_dest = Rtemp1 + RC |

In the case of arithmetic operations, should the instruction require updating of the flags, the carry flag will be updated on the basis of the result of the addition or of the subtraction, and hence it is not necessary to mask the contents of the register RtC, which will be ignored in the remaining part of the process of translation.

The last step of the translation is that of commitment. In this step, if the execution condition is verified, the value of the temporary destination register Rt_dest is written in the destination register.

All the data-processing operations can then optionally modify the status register; exceptions to this are the test and compare operations that necessarily execute this operation.

Since the LX processor does not have a status register, in this step a series of instructions will be executed on the destination register for establishing how to update the flags, if this is required by the high value of the bit 21 of the ARM opcode.

The zero flag is sent to a high level if the result of an operation is zero.

The sign flag is updated with the most significant bit of the result.

The carry flag for the logic operations is updated on the basis of the last bit coming from the source register following upon the shift in the step of generation of the operands.

For the operations of addition, C=1 indicates the presence of a carry and is set if:
both of the addenda are negative;
one of the addenda is negative and the result is positive.

For the operations of subtraction, C=0 indicates the presence of borrow. Considering the operation RES=A−B, with or without carry, C=1 if:
  A is negative and B is positive;
  one of the terms is negative and the result is positive.
The overflow flag is not modified by the logic operations.
For the operations of addition, V=1 if:
  both of the operands are positive and the result is negative;
  both of the operands are negative and the result is positive;
For the operations of subtraction (see above), V=1 if:
  A is negative, B is positive and the result is positive;
  A is positive, B is negative and the result is negative.

It is to speed up this step that each of the four flags (C, Z, N, V) is calculated and stored in a special temporary register (RtC, RtZ, RtN, RtV) and then saved, if the execution condition is verified, in an appropriate register (RC, RZ, RN, RV).

This latter set of registers will then be used for evaluating the condition of execution of the subsequent ARM instructions. It is again emphasized that the register ARM_CPSR, which emulates the behaviour of the register CPSR of the ARM processor, is not updated at each instruction that modifies it but only when there occurs a read operation thereon, so that the value read will be coherent with the one read in the normal execution of the same program on ARM.

In addition to the modification of the flags, in this step the value of the register of the LX processor that emulates the program counter of the ARM processor designated by ARM_R15/ARM_PC in Table 3 is updated.

If R15 is not the destination register, from the current value (i.e., PC+8) 4 is subtracted to point to the next ARM instruction.

If R15 is the destination register, the register ARM_PC is consequently updated, and the LX processor is forced to make a jump-to-link to the new value of said register.

If moreover it is necessary to update the status register, the register SPSR associated to the current mode is loaded into the register CPSR, and it is necessary to execute a complex procedure of switching of the operating mode of the ARM processor.

If the instruction does not cause a jump, the translating device is able, autonomously, to point to the next ARM instruction in memory, whilst if the operation modifies the contents of the program counter of the ARM processor it is necessary to force the device to point to the new value of ARM_PC.

This may be readily achieved by writing the new value of the ARM program counter in memory at the address associated to the ARM-pointer instruction of the translating device.

For the arithmetic instructions of addition (ADD, ADC) that entail updating of the status register and do not cause jumps, it is to be recalled that the updating of the carry flag and overflow flag occurs as follows:
C=1 indicates the presence of a carry and is set if:
  both of the addenda are negative,
  one of the addenda is negative and the result is positive;
V=1 if:
  both of the operands are positive and the result negative,
  both of the operands are negative and the result positive.
The commitment step is thus translated onto the LX processor as follows:

| ARM instruction | LX translation |
|---|---|
| ADDS@@ Rdest, Rsorg1, @@@ | Condition Evaluation |
| | 2$^{nd}$ Operand Generation |
| | Execution |
| | RtN=Rt_dest»31 |
| | Rtemp1 = Rshift_op »31 |
| | Rtemp2 = Rsorg1 »31 |
| | Rdest = ($Condition)? Rt_dest: Rdest |
| | Rtemp3 = Rtemp1 && Rtemp2 |
| | Rtemp4 = (Rtemp1 == 0) && (Rtemp2 == 1) |
| | Rtemp1 = Rtemp1 && (RtN == 0) |
| | Rtemp2 = Rtemp2 && (RtN == 0) |
| | Rtemp1 = Rtemp1 \|\| Rtemp2 |
| | Rtemp2 = Rtemp4 && (RtN == 0) |
| | Rtemp4 = Rtemp3 && (RtN == 0) |
| | RN = ($Condition)? RtN: RN |
| | RtV = Rtemp2 \|\| Rtemp4 |
| | RtC = Rtemp1 \|\| Rtemp3 |
| | RtZ = (Rt_dest == 0) |
| | RC = ($Condition)? RtC: RC |
| | RV = ($Condition)? RtV: RV |
| | RZ = ($Condition)? RtZ: RZ |
| | ARM PC = ARM PC − 4 |

For the compare instruction CMN, which performs an addition but does not write the result of the operation in a general-purpose register, the translation of the commitment step obviously becomes the following:

| ARM instruction | LX translation |
|---|---|
| CMN@@Rsorg1,@@@ | Condition Evaluation |
| | 2$^{nd}$ Operand Generation |
| | Execution |
| | RtN=Rt_dest»31 |
| | Rtemp1 = Rshift_op »31 |
| | Rtemp2 = Rsorg1 »31 |
| | Rtemp3 = Rtemp1 && Rtemp2 |
| | Rtemp4 = (Rtemp1 == 0) && (Rtemp2 == 1) |
| | Rtemp1 = Rtemp1 && (RtN == 0) |
| | Rtemp2 = Rtemp2 && (RtN == 0) |
| | Rtemp1 = Rtemp1\|\|Rtemp2 |
| | Rtemp2 = Rtemp4 && (RtN == 0) |
| | Rtemp4 = Rtemp3 && (RtN == 0) |
| | RN = ($Condition)? RtN: RN |
| | RtV = Rtemp2 \|\| Rtemp4 |
| | RtC = Rtemp1 \|\| Rtemp3 |
| | RtZ = (Rt_dest == 0) |
| | RC = ($Condition)? RtC: RC |
| | RV = ($Condition)? RtV: RV |
| | RZ = ($Condition)? RtZ: RZ |
| | ARM PC = ARM PC − 4 |

For the arithmetic instructions of subtraction (SUB, SBC, RSB, RSC) that involve updating of the status register and do not cause jumps, it should be recalled that the updating of the carry and overflow flags assumes the following form:

C=0 indicates the presence of borrow. Considering the operation RES=A−B, with or without carry, C=1 if:
  A is negative and B positive;
  one of the terms is negative and the result positive.
V=1 if:
  A is negative, B is positive and the result is positive;
  A is positive, B is negative and the result is negative.

When, instead, the destination register is the program counter of the ARM processor and updating of the status register is required, it is necessary to read the 5 LSBs of the status register to identify the current operating mode and choose which of the replications of the status register SPSR to save in the register CPSR. There follows a complex procedure that enables switching of the current operating mode of the ARM processor, which in practice almost perfectly reproduces the translation of the ARM instruction MSR (move to status register from general-purpose register).

For the detailed description of this procedure the reader is thus referred to the subsequent description of the translation of the instruction MSR.

In any case, the translation of the instruction ADDS that uses as destination register the program counter sets the LX link register, referred to as LX_LR, in a condition to make the jump and forces the translating device to point to the new ARM_PC value.

This is obtained by writing the new value of the ARM program counter in memory at the address associated to the ARM-instruction pointer of the translating device.

Likewise, if updating of the status register is not required, the CPSR must not be modified and the translation is simplified.

Obviously the use of 32-bit immediates in the translation (for example, ARMPOINTER_ADDR) must follow the constraints imposed by the LX processor for the encoding of the immediates. The translating device must ensure that the long immediates will be positioned in memory addresses corresponding to an even number of words, as required by the LX core.

The 3 LSBs of the address in which the long immediate is encoded must, that is, always be zero.

The instructions of multiplication and multiplication-with-accumulation behave in a way similar to the data-processing instructions. The former two types of instructions support, however, only the direct-from-register addressing, and, even though they support the S option, they never modify the carry and overflow flags but only the sign and zero flags.

Whilst the ARM processor is able to perform also multiplications of 32-bit numbers, obtaining a 64-bit result that is split on two destination registers, the LX processor can only perform multiplications of 16-bit numbers or of a 16-bit number with a 32-bit number, in any case truncating the result to 32 bits.

For this reason, the 32×32 multiplications of the ARM processor must be performed on the LX processor as a series of 16×16 multiplications and of additions with carry, according to the procedure described in what follows.

Let A and B be the two 32-bit operands contained in the two source registers; we indicate by AH and BH the high halfwords of A and of B, respectively, and by AL and BL the low halfwords.

$$A = AL + AH * 2^{16}$$

$$B = BL + BH * 2^{16}$$

$$A*B = AL*BL + (AH*BL + AL*BH) * 2^{16} + AH*BH * 2^{32}$$

In the case of 32×32 multiplication of a signed type, first the absolute values of A are determined by calculating the twos complement of the negative numbers; after which the unsigned multiplication is performed, as described previously. On the basis of the sign of the operands already extracted previously, there is then calculated the sign of the result, which, if negative, entails making the twos complement of the 64-bit number obtained from the multiplication of the absolute values.

Once the execution condition has been evaluated, the execution of the multiplication is translated.

If the instruction is a MUL, a multiplication of two 32-bit numbers is performed, with the result truncated at 32 bits. The positioning in the bundles of the multiplication operations must respect the constraints imposed by the LX processor. The translating device must ensure that the multiplications are positioned in memory addresses corresponding to an odd number of word, as required by the LX core.

The 3 LSBs of the address in which the long immediate is encoded must, that is, be 100.

There must moreover be respected the constraints on the latency of the multiplications, which is twice that of the data-processing instructions.

If the instruction is an MLA (multiply and accumulate), to the result of a MUL instruction there must be added the contents of a third source register Rsorg3.

If the instruction is an UMULL (unsigned multiply), it is necessary to make the multiplication of two 32-bit unsigned numbers and split the 64-bit result obtained on two registers: the high part is saved in the temporary register Rt_dest awaiting the commitment step, whilst the low part is saved in the temporary register Rtemp1.

For the instruction UMLAL (unsigned multiply and accumulate), it is necessary only to add to the result of the UMULL instruction the 64-bit number previously contained in the registers RdHi and RdLo, remembering to propagate the carry of the addition.

If the instruction is a SMULL (signed multiply), it is necessary to make the multiplication of two 32-bit signed numbers in twos complement and split the 64-bit result obtained on two registers: the high part is saved in the temporary register Rt_dest awaiting the commitment step, whilst the low part is saved in Rtemp1.

To make the signed multiplication, first the absolute values of the two operands are calculated, then the unsigned multiplication is performed as for the UMULL instruction, and finally, if the two operands had opposite sign, the twos complement of the 64-bit number resulting from the multiplication of the absolute values is performed.

The translation is thus the following:

| ARM instruction | LX translation |
|---|---|
| SMULL@@ RdHi, RdLo,Rsorg1,Rsorg2 | Condition Evaluation |
| | Rtemp1 = – Rsorg1 |
| | Rtemp2 = – Rsorg2 |
| | Rtemp3=Rsorg1»31 |
| | Rtemp4 = Rsorg2 »31 |
| | $Neg1 = (Rtemp3 = = 1) |
| | $Neg2 = (Rtemp4 = = 1) |
| | $PosRes = (Rtemp3 = = Rtemp4) |
| | Rtemp7 = ($Neg1)? Rtemp1: Rsorg1 |
| | Rtemp8 = ($Neg2)? Rtemp2: Rsorg2 |
| | $Carry0 = OR |
| | Rtemp1 = 16lsb_of (Rtemp7) * 16msb_of(Rtemp8) |
| | Rtemp2 = 16lsb_of (Rtemp8) * 16msb_of(Rtemp7) |
| | Rtemp3 = 16lsb_of(Rtemp7) * 16lsb_of(Rtemp8) |
| | Rtemp4 = 16msb_of(Rtemp7) * 16msb_of(Rtemp8) |
| | Rtemp1 = Rtemp1 «16 |
| | Rtemp5 = Rtemp1 »16 |
| | Rtemp2 = Rtemp2 «16 |
| | Rtemp6 = Rtemp2 »16 |
| | Rtemp5 = Rtemp5 + Rtemp6 |
| | $Carry1,Rtemp1 = Rtemp1 + Rtemp3 + $Carry0 |
| | $Carry2,Rtemp8 = Rtemp4 + Rtemp5 + $Carry1 |
| | $Carry1,Rtemp7 = Rtemp1 + Rtemp2 + |

-continued

```
$Carry0
$Carry2,Rtemp8 = Rtemp8 + $Carry1
$LowIsZero = (Rtemp7 = = 0)
Rtemp1 =- Rtemp7
Rtemp3 =~ Rtemp8
Rtemp1 = ($PosRes)? Rtemp7:
Rtemp1
$Carry2,Rtemp2 = Rtemp3 +
$LowIsZero
Rt_dest = ($PosRes)? Rtemp8:
Rtemp2
```

Note that, to make the twos complement of the 64-bit result it is necessary to check whether the 32 least significant bits are all zeros or not in order to decide whether the top part must be twos-complemented or negated.

For the instruction SMLAL (signed multiply and accumulate), it is necessary only to add to the result of the SMULL instruction the 64-bit number previously contained in the registers RdHi and RdLo, remembering to propagate the carry of the addition.

Like the data-processing instructions, the multiplications support the S option and terminate with a similar commitment step, which, however, does not update the overflow and carry flags.

From the point of view of the translation, the operations of access to memory differ fundamentally from the data-processing operations because they cannot be executed in a predicative way. In fact, whilst it is possible to perform, in any case, an addition or a multiplication and then decide whether to write or not the result thereof in the destination register, this approach does not of course have any sense for the operations of writing in memory.

The said method is moreover not applicable for the reading operations either, because if the access in reading takes place in a memory location on which a device is mapped (for example, a UART), the access may cause a loss or modification of the information contained in that location.

Also for the reasons expressed above, the translation of the operations on the memory follows a procedure different from the one for the data-processing instructions.

The instructions of single access to memory comprise both the instructions of Mode 2 and those of Mode 3. All these instructions use, for addressing, a base register, to which is added or from which is subtracted an offset that may be obtained in various ways.

The Mode 2 instructions are the operations of load&store of words and unsigned bytes. There are nine addressing modes supported:

base register +/− 12-bit immediate;
base register +/− offset register;
base register +/− scaled offset register (the offset register is shifted with modes analogous to the data-processing instructions; the amount of the shift is described by an immediate);
base register +/− pre-indexed immediate (the base register is updated before accessing a memory);
base register +/− pre-indexed offset register;
base register +/− pre-indexed scaled register;
base register +/− post-indexed immediate (the base register is updated after accessing a memory);
base register +/− post-indexed offset register;
base register +/− post-indexed scaled register.

The operations of load&store in memory of mode 3 act on halfwords and signed bytes. The addressing modes supported are six of the nine associated to Mode 2:

base register +/− 8-bit immediate;
base register +/− offset register;
base register +/− pre-indexed immediate;
base register +/− pre-indexed offset register;
base register +/− post-indexed immediate;
base register +/− post-indexed offset register.

As explained previously, the ARM processor enables accesses to words with non-word-aligned addresses, whilst the LX processor does not enable them and, in these cases, triggers an exception. For this reason, the translation of the accesses to memory of the ARM processor must necessarily envisage an operation of truncation to generate word-aligned or halfword-aligned addresses. Furthermore, since both the ARM processor and the LX processor are potentially bi-endian, should the endianness, i.e., the representation of the integers from right to left or left to right, of the two systems be different, it is necessary to carry out the appropriate operation of swapping by words or halfwords.

The translation of the instructions of Modes 2 and 3 takes place with two similar processes, which are differentiated only as regards the addressing modes supported and the different translations of the access-to-memory step. These differences, as will emerge more clearly in what follows, are aimed at obtaining, in every case, the translation that can be executed faster on an LX processor.

After the first step of decoding and translation of the conditional field as for the data-processing instructions, there is the translation of the addressing mode and the consequent generation of the address for access to memory.

In this step, both the address for access to memory and the value with which, if required, it will be necessary to update the base register at the end of the execution of the instruction are calculated.

The two values are stored in the temporary registers Rshift_op and Rtemp6, respectively.

There is then translated the load or store operation, which, as explained previously, must first check whether the execution condition is verified or not and, if it is not, not to access but to jump to the last bundle of the translation and then make a jump-to-link, and then access the next ARM instruction to be executed.

There now follows a detailed analysis of the translation of some of the various addressing modes, starting from those common to Modes 2 and 3.

The addressing mode is described by the bits from 21 to 25 of the ARM opcode.

In the case of addressing with base register +/− immediate, the base register must not be updated, whilst the register Rshift_op, which will be used as pointer to the memory, must contain the result of the addition (or of the subtraction) of the base register and of the long offset immediate:

| ARM instruction | LX translation |
|---|---|
| LDR@ @ Rdest, | Condition Evaluation |
| [Rbase, # +1− imm] | Rtemp6 = Rbase |
| | Rshift_op = Rbase + #sign_imm |
| | sign_mm = +/− |
| sign_imm = +/− imm | |

In the case of addressing with pre-indexed immediate, also the base register must be updated at the end of the operation; then the register Rtemp6 is consequently modified.

In the case of addressing with post-indexed immediate, the base register must be updated at the end of the operation but the access to memory must be made at the current value of the base register.

In the case of addressing with offset contained in a register, the process is analogous.

The operations of Mode 2 also support the addressings with scaled offset register (with the usual modes LSL, LSR, ASR, ROR, RRX). The translation of these modes consists, in the first place, in obtaining the offset by means of the operations of shift or rotation, and then in updating the registers Rtemp6 and Rshift_op according to the procedures already seen.

Once the addressing mode has been translated, the execution of the access to memory is translated. The translation of the access varies totally according to the format of the datum to be read or written in memory.

The accesses to bytes do not present problems of endianness or of alignment. Examples of accesses to bytes are the instruction STRB (store unsigned byte, Mode 2) and the instruction LDRB (load unsigned byte, Mode 2).

Note that, on account of the latency of the byte-loading operation, which involves waiting two bundles for access to the byte read, it is necessary to insert an empty bundle in order to render the contents of the register Rdest immediately available to the next ARM instruction and thus prevent read hazards.

Note, moreover, that since it is possible that the destination register will coincide with the base register when the latter does not need to be updated by the post-indexed or pre-indexed modes, it is necessary to carry out first writing in the register Rbase and then writing in the register Rdest in two separate bundles.

The instruction LDRSB (load signed byte) forms part of Mode 3 and as such does not allow addressing with scaled offset register. The byte read is extended with sign.

The LX processor requires the memory operations that involve halfwords to be halfword-aligned, whilst the ARM processor, at the moment of access to memory, ignores the last bit of the address, and then, if necessary, swaps the two bytes read with one another if the rejected bit was 1.

The store operations, instead, ignore the last bit completely.

It is moreover necessary to pay attention to the endianness of the ARM processor and LX processor: if the two systems use different conventions it is necessary to swap the bytes of the halfwords read with one another.

Access to halfwords of the ARM processor will then be translated into two individual accesses to bytes of the unsigned type to speed up execution in the case where it is necessary to swap the bytes of the halfword (i.e., convert the hexadecimal word xxxxYyZz into the word xxxxZzYy).

The instruction LDRH (load unsigned halfword, Mode 3) reads the halfword byte by byte from the destination register and writes it in the destination register by carrying out or not carrying out the swap according to the endianness of the ARM processor and least significant bit of the address. The other halfword of the destination register is filled with zeros.

It is emphasized how, in order to save time in the case where it were necessary to make the swap of the bytes read, both the word read and its swapped version are pre-calculated, and then the correct version is chosen on the basis of the endianness of the ARM system.

The endianness of the LX processor in this case is of no effect because the accesses are made byte by byte.

The instruction LDRSH (load signed halfword, Mode 3) is similar to the previous one, with the only difference that the bytes are read with sign and then the least significant is masked with 0x00FF to construct the halfword already sign-extended.

Otherwise, the translation strategy is identical to the previous case.

In the bi-endian case, it is just sufficient to swap the roles of Rtemp1 and Rtemp2 in the last bundle.

For the translation of the accesses to words a different approach is chosen: rather than making four accesses to consecutive bytes and then constructing the word on the basis of the endianness of the ARM processor, it is preferred to make a single word-aligned access and then possibly make the swap of the bytes should the endianness of the ARM processor and LX processor be different.

In this way, if the ARM processor and the LX processor have the same endianness the gain in terms of speed of execution is considerable, whereas when the endianness is different, the two solutions, with four accesses or with single access, are practically equivalent.

The instruction STR (store word, Mode 2) ignores the two least significant bits of the address and is hence self-aligned. When the endianness of the ARM processor and LX processor is different, the translation of the instruction comprises the swap of the bytes of the word read: the hexadecimal word 0xAaBbCcDd is converted into 0xDdCcBbAa. If the endianness of the two systems is, instead, the same, all the bundles dedicated to the swap are spared.

The instruction LDR (load word, Mode 2) has a more complex translation process for various reasons:

the access is made, neglecting the two least significant bits of the address, but then the word read must be swapped if the endianness of the ARM processor and LX processor is different and also rotated to the right by a number of positions equal to eight times the value of the two address bits ignored (for example, if the address ends in 11 the word must be rotated by 24 positions);

if the destination register of the load operation is the program counter of the ARM processor, the instruction may generate a jump, and it is thus necessary to make sure that the value loaded is word-aligned and set the translating device for pointing to the ARM instruction that is the target of the jump.

Irrespective of whether the destination register is or not the register ARM_PC, the first part of the translation is the same and, in the case where it is necessary to make the swap, we have:

| ARM instruction | LX translation |
|---|---|
| LDR@@ Rdest, [Rbase, @ @ @ | Condition Evaluation |
| | Address generation |
| | Rshift_op = Rshift_op & 0xFFFFFFFC |
| | Rtemp5 = Rshift_op & 0x03 |
| | Rbase = ($Condition)? Rtemp6: Rbase |
| | IF (! $Condition) GOTO end |
| | Rt_dest = MemoryWord(Rshift_op) |
| | Rtemp5 = Rtemp5 «3 |
| | Rtemp1 = 0x00FF |
| Bundle dedicated exclusively to the swap operation | Rtemp6 = 32 − Rtemp5 |
| | Rtemp1 = Rtemp1 «8 |
| | Rtemp3 = Rtemp1 «16 |
| | Rtemp2 = Rt_dest »8 |
| | Rtemp4 = Rt_dest «8 |
| | Rtemp1 = Rt_dest »24 |
| | Rtemp3 = Rt_dest «24 |
| | Rtemp2 = Rtemp2 & Rtemp1 |
| | Rtemp4 = Rtemp4 & Rtemp3 |

```
Rtemp2 = Rtemp1 | Rtemp2
Rtemp4 = Rtemp4 | Rtemp3
Rt_dest = Rtemp2 | Rtemp4
Rt_dest = Rt_dest «Rtemp5
Rtemp1 = Rt_dest »Rtemp6
Rdest = Rtemp1] Rt_dest
```

Once the memory has been accessed and any possible operations of swapping and rotation of the word read have been completed, if the destination register is not ARM_PC the translation terminates by simply updating the program counter itself:

| ARM instruction | LX translation |
|---|---|
| LDR@ @ Rdest, [ Rbase, @ @ @ | Condition Evaluation |
| | Address generation |
| | Memory Access |
| | end: ARM_PC = ARM_PC − 4 |

When, instead, the destination register is actually ARM_PC, version 5 of the instruction set of the ARM processor requires that the word read be made halfword-aligned and that the least significant bit of the word should establish whether to enter or not Thumb state, setting bit 5 of the status register ARM_CPSR.

It is then necessary to set the device for pointing to the destination address of the jump.

| ARM instruction | LX translation |
|---|---|
| LDR@@ R15, [Rbase, @@@ | Condition Evaluation |
| | Address generation |
| | Memory Access |
| | Rtemp1 = ARM_PC & 1 __ |
| | LXJLR = ARM_PC & 0xFFFFFFFE |
| | Rtemp3 = ARMPOINTER_ADDR |
| | Rtemp1 = Rtemp1 «5 __ |
| | ARM.CPSR = ARM_CPSR & 0xFFFFFFDF |
| | ARM PC = ARM_PC & 0xFFFFFFFE |
| | MemoryWord (Rtemp3) = ARM_PC |
| | ARM_PC = ARM_PC + 4 |
| | ARM.CPSR = ARM_CPSR | Rtemp1 |
| | GOTO LX_LR |
| | End: ARM PC = ARM_PC − 4 |

The operations of multiple load&store of Mode 4 contain, within their opcode, a field of 16 bits that marks with a high-level bit the registers involved in the transfer.

The last sixteen bits of the opcode are then examined one by one, and for each high-level bit, a load-word operation or store-word operation is carried out on the register associated to that bit.

These operations present four addressing modes:

increment after (suffix IA);

increment before (suffix IB);

decrement after (suffix DA);

decrement before (suffix DB).

The base register, if specified by the bit 21 of the opcode being at a high level, is updated at the end of each single load or store operation with the value of the next pointed location.

It should be emphasized that, whether updating is made by decrement or by increment, the registers with a higher number are associated to the higher addresses and the registers with a lower number are associated to the lower addresses.

There then exist versions of the multiple load&store that can be executed only in privileged operating mode, which enable loading of the program counter from the memory or access to the general-purpose registers of the User mode. Once each register of the ARM processor has been mapped, including the replicated ones, on a register of the LX processor, access to the registers of the User mode may be achieved immediately.

Mapping of the registers of the ARM processor on the LX processor, detailed in Table 3, is handled by mapping the registers of the current mode on the registers of the LX processor from R16 to R31 in such a way that translation of the operations will be immediate. For the vast majority of the instructions of the ARM processor, in fact, these are the only registers accessible, and the register of the LX processor can be obtained from the register of the ARM processor specified in the opcode by simply adding 16 to the number identifying the register.

The registers R13 and R14 of the ARM processor replicated for the Supervisor, Interrupt, Abort and Undefined modes are mapped on registers from R40 to R46, which will serve as "stack" registers for R29 and R30 when the current mode is different from the one associated to the register replicated.

In the same way, R45 and R46 constitute the stack registers for R13 and R14 for the User and System modes, as likewise R54 and R55 for the Fast-Interrupt mode (FIQ).

The registers from R40 to R44 of the LX processor constitute an area of stack that will contain registers from R8 to R11 of the User mode of the ARM processor when the current mode is the Fast-Interrupt one, or else the replicated registers of the Fast-Interrupt mode from R8 to R11 when this is not the current mode.

The multiple load operations can also load a datum from the memory into the program counter of the ARM processor, generating a jump and, in version 5 of the instruction set, by updating the register CPSR with the register SPSR of the current mode. The operations for loading the program counter are hence treated in a different way from those that involve the other registers, also because it is necessary to prevent a non-word-aligned value from being loaded into ARM_PC.

It should moreover be emphasized that each store operation of the program counter writes in memory the updated value, which is equal to the PC of the current instruction increased by eight.

All the operations of Mode 3 only make word-aligned accesses, ignoring the two least significant bits of the base register. The updated value of the base register, however, will be calculated considering also these last two bits.

The instruction STM (multiple store) has two execution modes:

in Mode 1, the instruction can be executed in any operating mode of the ARM processor and makes it possible to save, in consecutive memory locations, any subset of the registers of the current mode;

in Mode 2, the instruction can be executed only in a privileged mode, whilst its effect is unforeseeable in the User and System modes. This mode makes it possible to save, in memory, any subset of the registers of the User/System modes.

The process of translation of the instruction STM, apart from the customary evaluation of the execution condition, may be divided into three steps:

an initial step, in which there is obtained a word-aligned address, masking the two least significant bits of the base register and, if the execution condition is not verified, there is a jump to the end of the program. In Mode 2, in this step the status register CPSR is read to understand whether the operating mode of the ARM processor is User/System, FIQ (and hence has more replicated registers) or another privileged mode;

a cycle that scans the 16 least significant bits of the opcode and for each of them, on the basis of the register and the current operating mode, translates the writing in memory with the possible swapping, should the endianness of the ARM and LX systems differ. The order of scanning of the list of registers, whether the updating of the addresses is by decrement or by increment, must be such that the registers with a higher number will be associated to the higher addresses and the registers with a lower number will be associated to the lower addresses;

a final step, in which the register ARM_PC is updated, the contents of which cannot be modified by the instruction STM, and if necessary the writeback of the base register is performed. Even though, during access to memory, the two least significant bits of the address must not be ignored for generating word-aligned accesses, during the writeback step it is necessary to take account thereof.

In the translation, there is inserted an explicit NOP (no operation) to give the LX core time to evaluate the execution condition before the possible jump. The LX processor requires, in fact, that between the writing in a branch bit and the execution of the conditioned jump thereto there should intervene at least one bundle of instructions.

The scanning of the bits of the list of registers involved in the transfer starts from bit 0 and arrives at bit 15 in the case of addressing by increment, whilst it proceeds in the opposite direction if the addressing is by decrement. According to whether the addressing is of the before or after type, the value of the base register must be increased (in the case of increment) or decreased (in the case decrement) by 4 before or after carrying out writing in memory of each register.

In Mode 1, the registers to be written in memory are the ones associated to the current operating mode of the ARM processor: these registers are always mapped on the LX registers from R16 (ARM_R0) to R31 (ARM_R15/ARM_PC).

If the endianness of the ARM and LX processors is the same, it is not necessary dedicate bundles to the swap.

The translation of the previous instruction is valid also for the instruction STM of Mode 2 for the registers not replicated in any privileged mode, i.e., ARM_R15 and all the registers from ARM_R0 to ARM_R7.

Instead, in Mode 2 for the registers from ARM_R8 to ARM_R12 this translation is not suitable. These registers are in fact replicated for the FIQ mode and when the ARM processor enters this mode the registers from R8 to R12 of the User/System mode are saved in the registers of the LX processor from ARM_R8stack to ARM_R12stack. The translation must therefore start by choosing which register to write in memory between ARM_Rxstack (if the current mode is FIQ) and ARM_Rx (in all the other cases).

The last case to be considered is that of the instruction STM of Mode 2 for the registers R13 and R14.

In this case, the registers are replicated for each of the privileged modes and hence, when the current mode is not User or System, it is necessary to save the register ARM_R13stack or ARM_R14stack instead of the corresponding current-mode register ARM_R13 or ARM_R14.

The translation of the instruction STM ends with updating of the register ARM_PC and possibly with updating of the base register if the instruction requires writeback.

The instruction LDM (multiple load) has three different execution modes:

in Mode 1, the instruction can be executed in any operating mode of the ARM processor and enables reading from consecutive memory locations and writing the data read in any subset of the registers of the current mode;

in Mode 2, the instruction can be executed only in a privileged mode, whilst its effect is unforeseeable in the User and System modes. The privileged mode enables saving of the data read from the memory in any subset of the registers of the User/System modes. The contents of ARM_PC cannot be modified;

in Mode 3, the instruction can be executed only-in a privileged mode, whilst its effect is unforeseeable in the User and System modes. The privileged mode enables saving of the data read from the memory in any subset of the current-mode registers that comprises the register ARM_PC. Furthermore, the register ARM_3PSR of the current mode is copied in ARM_CPSR. It is necessary to read the 5 LSBs of the status register to identify the current operating mode and choose which of the replications of the status register SPSR to save in the register CPSR. There follows a complex procedure that enables switching of the current operating mode of the ARM processor to be made, which in effect reproduces almost perfectly the translation of the ARM instruction MSR (move to status register from general-purpose register). For the detailed description of this procedure, the reader is thus referred to the subsequent description of the translation of the instruction MSR.

The process of translation of the instruction LDM is analogous to that of the instruction STM but, from what has been said previously, it has to respect a greater number of particular cases.

Of course, writing on the program counter of the ARM processor may generate a jump in the execution of the ARM code, and the translating device must be prepared to execute it, pointing to the instruction destination of the jump.

The translation is altogether analogous to that of the initial step of the instruction STM, with the only difference that the wait bundle of the branch bit that precedes the conditioned jump is exploited for loading the link register of the LX processor in anticipation of the unconditioned jump to be made at the end of translation.

For Modes 1 and 3, which access just the current-mode registers, the last two bundles are not necessary.

The scanning of the bits of the list of registers involved in the transfer follows exactly the same rule used for the instruction STM.

Also in this case then, according to whether the addressing is of the before or after type, the value of the base register must be increased (in the case of increment) or decreased (in the case of decrement) by 4 before or after carrying out reading in memory and loading of the value read in each register.

In Modes 1 and 3, the registers to be written are the ones associated to the current operating mode of the ARM processor: these registers are always mapped on the registers of the LX processor from R16 (ARM_R0) to R31 (ARM_R15/ARM_PC).

The previous translation is valid also for the instruction LDM of Mode 2 for the registers not replicated in any privileged mode, i.e., the ones from ARM_R0 to ARM_R7.

Instead, in Mode 2, for the registers from ARM_R8 to ARM_R12, this translation is not acceptable. These registers are in fact replicated for the FIQ mode, and when the ARM processor enters this mode the registers from R8 to R12 of the User/System mode are saved in the LX registers from ARM_R8 stack to ARM_R12 stack.

Therefore, once access to memory and the possible swap have been performed, the translation must terminate, choosing in which register to write the datum read between ARM_Rxstack (if the current mode is FIQ) and ARM_Rx (in all the other cases).

Note how, in this case, only four of the bundles dedicated to the swap can be avoided if the systems have the same endianness. The load-word operation in fact has twice the latency of the LX data-processing instructions, and thus requires a wait bundle between the operation of access to memory and the use of the destination register.

Yet a different translation involves writing of the registers R13 and R14 of the User/System mode, for the instruction LDM of Mode 2. In this case, the registers are replicated for each of the privileged modes and hence, when the current mode is not User or System, it is necessary to write the register ARM_R13stack or ARM_R14stack, instead of the corresponding current mode register ARM_R13 or ARM_R14.

There remain to be analysed the cases of writing of the program counter in Modes 1 and 3.

In the first case, it is necessary to make the jump to the value written in the program counter of the ARM processor and pre-arrange the translating device for the jump, forcing it to point to the destination address of the jump. Version 5 of the instruction set of the ARM processor requires that the word read be rendered halfword-aligned and that the least significant bit of the word should establish whether to enter or not the Thumb state, setting bit 5 of the status register ARM_CPSR.

In Mode 3, instead, for version 5 of the instruction set of the ARM processor, it is necessary to make the jump to the value written in the program-counter of the ARM processor and pre-arrange the translating device for the jump, forcing it to point to the destination address of the jump.

If the ARM processor is working in Thumb state the word read must be rendered halfword-aligned; otherwise, it must be rendered word-aligned.

In either case, however, the status register ARM_SPSR of the current mode must at any rate be written in the status register ARM_CPSR.

The translation of the instruction LDM terminates with the updating of the register ARM_PC (which, if it has been loaded by a previous load operation, has also already been incremented by four) and possibly with the updating of the base register if the instruction requires writeback.

If, instead, the register ARM_PC is not modified and writeback is not required, the translation of the final step becomes simpler.

The ARM processor has a further two access-to-memory instructions: SWP (swap word) and SWPB (swap byte). These instructions each make two accesses-to-memory by loading in a first register the contents of a memory location pointed to by a base register and by writing, in the same memory location, the contents of a second register. If the first register and the second register coincide, the contents of the register and of the memory location have been swapped.

The instruction SWP behaves exactly like a pair of LDR and STR instructions; consequently, it is necessary to take into account the endianness of the two systems and to make the possible rotation of the word read on the basis of the two least significant bits of the address.

Note that if the endianness of the two systems is different the swap operations to be made are two: one on the word read by the load operation and one before executing the store operation.

It is emphasized that for the ARM processor all the swap operations that involve the program counter, both as operand and as base register, are unpredictable.

The instruction SWPB does not present problems of endianness and has a much simpler translation, provided that the precaution is taken of separating the last two instructions of the translation to make possible access to the destination register Rdest in the first bundle of the translation of the next ARM instruction, without giving rise to read hazard.

The LX instructions for reading of a byte in memory (LDB and LDBU) entail, in fact, waiting for two bundles before access to the read byte.

The ARM processor has then three jump instructions:

PC-relative conditioned jump (with and without storage of the return address): the 24-bit offset is contained in the opcode of the jump. To calculate the destination address, the latter is multiplied by four (in so far as each ARM opcode occupies 32 bits) and extended with sign, and is then added to the current value of the program counter. It should be emphasized that, as a result of the architecture of the pipeline of the ARM processor, at the moment of the updating that occurs in the execution step, the program counter contains the address of the jump instruction incremented by eight;

unconditioned jump with change of mode: the processor performs a jump with a 24-bit offset, stores the return address in the link register, and enters Thumb mode, modifying the T bit of the status word;

conditioned jump with change of mode (with or without storage of the return address): the processor performs a jump to the address contained in an index register. The value of the index register is aligned, neglecting its least significant bit, which is used for deciding the mode of operation (if it is at a high level, Thumb mode; otherwise, ARM mode).

Both the Jumps to PC-relative offsets and the jumps from register are translated on LX with a jump-to-link operation, also as a result of the fact that the ARM processor can make longer PC-relative jumps than the LX processor, the opcodes of which contain a field that supplies the offset one bit shorter than the ARM.

The ARM instruction B (branch) performs a conditioned PC-relative jump, without storing the return address in the link register.

The offset contained in the opcode must be extended with sign and multiplied by two to obtain the offset expressed as number of bytes.

Its translation starts with the customary evaluation of the execution condition and continues in the following way:

| ARM instruction | LX translation |
|---|---|
| B@@ signed_offset | Condition Evaluation |
| | Rt_dest = ARM_PC + #byte_offset |
| | ARM_PC = ARM_PC−4 |
| | ARM_PC = ($Condition)? Rt_dest: ARM_PC |

| | |
|---|---|
| Byte_offset = signed_offset «2 | LX_LR = ($Condition)? Rt_dest: ARM_PC<br>Rshift_op = ARMPOINTER_ADDR<br>MemoryWord(Rshift_op) = LX_LR<br>GOTO LX_LR |

The instruction BL (branch and link) performs a conditioned PC-relative jump, storing the return address in the link register of the ARM processor (R14).

The instruction BX (branch and exchange to Thumb) performs a conditioned jump to the address contained in a target register, without storing the return address.

The value contained in the target register Rtarget must be rendered halfword-aligned, and its least significant bit, which was rejected during the operation of alignment, goes to modify the T bit of the status register ARM_CPSR. Sending the T bit to the high level, the processor enters the Thumb mode.

The instruction BLX (branch, link and exchange to Thumb) of Mode 2 is identical to the previous BX but stores the return address in the link register of the ARM processor.

There also exists another version of the instruction BLX, which performs a PC-relative jump and is referred to as Mode 1.

This instruction does not support conditional execution and contains within the opcode a 24-bit immediate offset that must be multiplied by four, extended with sign, and then added to the current value of the program counter.

The bit 24 (H bit) of the opcode must be multiplied by two and added to the updated value of the program counter to obtain a destination address, which is in any case halfword-aligned.

The ARM processor must always enter the Thumb state.

The ARM processor moreover has two instructions dedicated to the handling of the status registers that enable reading and writing of the status registers CPSR and SPSR associated to the current mode.

If the instruction has SPSR as source or destination, since all the modes of operation of the ARM processor, except the User mode and the System mode, have a replicated SPSR, the first thing to do is to identify the current mode on the basis of the contents of the LX register that emulates the register CPSR of the ARM processor.

If the aim is not to access the resources of the LX core directly, the current mode (described by the five least significant bits of the CPSR) is identified by means of a series of compare operations that set a different LX branch bit for each operating mode of the ARM processor. For the reading operations of the state (MRS), at this point, by means of a series of select operations (SLCT) it is decided what to write in the destination register. For the operations of writing (MSR), once again through a series of select operations, just the value of the SPSR associated to the current status is updated, whilst the others are left unchanged.

Access to the register CPSR obviously does not present this problem, but writing therein may force a change of the operating mode of the ARM processor. The mapping of the registers of the ARM processor on LX has been described previously and is represented in Table 3.

The operations MSR (move to status register from register) modify with an immediate or with the contents of a source register one or more of the bytes making up a status register.

The bytes to be modified are identified by the mask that occupies the bits from 16 to 19 of the opcode: for each high bit of the mask, the corresponding byte of the status word is modified.

First, consider the case of addressing from register, with CPSR as destination.

The translation of this instruction envisages the following steps, which must be performed by all the instructions that can change the operating mode of the ARM processor:

1) The current operating mode of the ARM processor is determined by means of a series of compare operations that set a different branch bit for each mode, and the source register and the register CPSR are masked with two complementary masks.

Writing on the register CPSR in User mode must be ignored.

| ARM instruction | LX translation |
|---|---|
| MSR CPSR_<fields>, Rsorg | Condition Evaluation<br>NOP<br>Rtemp1 = ARM_CPSR & 0x01F<br>Rtemp2 = Rsorg & #field_mask<br>IF (! $Condition) GOTO end |
| Field_mask = Mask (<fields>) | $IsUSR = (Rtemp1 = = 16)<br>$IsSYS = (Rtemp1 = = 31)<br>$IsFIQ = (Rtemp1 = = 17)<br>$IsSPV = (Rtemp1 = = 19)<br>$IsIRQ = (Rtemp1 = = 18)<br>$IsUND = (Rtemp1 = = 27)<br>$IsABT = (Rtemp1 = = 23)<br>Rtemp1 = ARM_CPSR & (~#field_mask)<br>IF ($IsUSR) GOTO end |

2) The contents of the registers from R8 to R12 of the ARM processor are swapped with the corresponding ones of the stack area, to prepare for a possible transition to the FIQ mode.

| ARM instruction | LX translation |
|---|---|
| MSR CPSR_<fields>, Rsorg | ...<br>ARM_R8 = ARM_R8stack<br>ARM_R8stack = ARM_R8<br>ARM_R9 = ARM_R9stack<br>ARM R9stack = ARM_R9<br>ARM_R10 = ARM_R10stack<br>ARM_R10stack = ARM_R10<br>ARM_R11 = ARM_R1 Istack<br>ARM R11stack = ARM_R11<br>ARM_R12 = ARM_R12stack<br>ARM_R12stack = ARM_R12<br>IF ($IsSPV) GOTO spv_proc |

3) Once the current mode has been identified, the values of the registers R13 and R14 are saved in the corresponding replicated registers.

| ARM instruction | LX translation |
|---|---|
| MSR CPSR_<fields>, Rsorg | IF ($IsIRQ) GOTO irq_proc<br>IF ($IsUND) GOTO und_proc<br>IF ($IsABT) GOTO abt_proc<br>IF ($IsFIQ) GOTO fiq_proc<br>Spv_proc: ARM_R13spv = ARM_R13<br>ARM_R14spv = ARM_R14<br>GOTO continue<br>irq_proc: ARM_R13irq = ARM_R13<br>ARM_R14irq = ARM_R14 |

| ARM instruction | LX translation |
|---|---|
| | GOTO continue
und_proc: ARM_R13und=ARM_R13
ARM_R 14und = ARM_R14
GOTO continue
abt_proc: ARM_R13abt = ARM_R.13
ARM_R14abt = = ARM_R14
GOTO continue
fiq_proc: ARM_R13fiq = ARM_R13
ARM_R14fiq = ARM_R14 |

4) The register CPSR and the flag registers are updated.

| ARM instruction | LX translation |
|---|---|
| MSR CPSR_<fields>, Rsorg | ...
continue: ARM_CPSR = Rtemp1 | Rtemp2
Rtemp1 = ARM_CPSR & 0x0lF
RtV = ARM.CPSR »28
RtC = ARM_CPSR »29
RtZ = ARM_CPSR »30
RN = ARM_CPSR »31
RV = RtV & 0x01
RC = RtC & 0x01
RZ = RtZ & 0x01 |

5) the new operating mode of the ARM processor is determined as in point 1.

| ARM instruction | LX translation |
|---|---|
| MSR CPSR_<fields>, Rsorg | $IsFIQ = (Rtemp1 = = 17)
$IsSPV = (Rtemp1 = = 19)
$IsIRQ = (Rtemp1 = = 18)
Rtemp6 = (Rtemp1 = = 31 )
Rtemp5 = (Rtemp1 = = 16 )
$IsUND = (Rtemp1 = = 27 )
$IsABT = (Rtemp1 = = 23 )
$IsUNPRV = (Rtemp6 = = 1) || (Rtemp5 = = 1)
IF ($IsFIQ) GOTO get_fiq |

6) If there has not been a switch to the FIQ mode, the values of the registers that were shifted in point 2) are re-swapped.

| ARM instruction | LX translation |
|---|---|
| MSR CPSR_<fields>, Rsorg | ...
ARM_R8 = ARM_R8stack
ARM_R8stack = ARM_R8
ARM_R9 = ARM_R9stack
ARM_R9stack = ARM_R9
ARM_R10 = ARM_R10stack
ARM_R10stack = ARM_R10
ARM_R11 = ARM_R11stack
ARM_R11 stack = ARM_R11
ARM_R12 = ARM_R12stack
ARM_R12stack = ARM_R12
... |

7) The contents of the replicated registers associated to the new mode are written in R13 and R14.

| ARM instruction | LX translation |
|---|---|
| MSR CPSR_<fields>, Rsorg | ...
IF$isSPV) GOTO get.spv
IF ($IsIRQ) GOTO getJrq
IF ($IsUND) GOTO get_und
IF ($IsABT) GOTO get_abt
ARM_R13 = ARM_R13stack
ARM_R14 = ARM_R14stack
get_spv: ARM_R13 = ARM_R13spv
ARM_R14 = ARM_R14spv
GOTO end
get_rq: ARM_R13 = ARM_R13irq
ARM_R14 = ARM_R14irq
GOTO end
get_und: ARM_R13 = ARM_R13und
ARM_R14 = ARM_R14und
GOTO end
get_abt: ARM_R13 = ARM_R13abt
ARM_R14 = ARM_R14abt
GOTO end
getfiq: ARM_R8 = ARM_R8stack
ARM_R8stack = ARM_R8
ARM_R9 = ARM_R9stack
ARM_R9stack = ARM_R9
ARM_R10 = ARM_R10stack
ARM_R10stack = ARM_R10
ARM_R11 = ARM_R11stack
ARM_R11 stack = ARM_R11
ARM_R12 = ARM_R12stack
ARM_R12stack = ARM_R12
ARM_R13 = ARM_R13fiq
ARM_R14 = ARM_R14fiq
end: ARM_PC = ARM_PC − 4 |

The instruction MSR, which writes an immediate in the register CPSR, has a translation altogether analogous to the previous one.

When, instead, the destination register of the instruction MSR is the register SPSR of the current mode, the translation changes because it is necessary to identify the current status and in the meantime prepare the updatings of the SPSR for the various modes (access to the SPSR in the User and System modes renders the execution unforeseeable).

Finally, just the register SPSR of the current mode is updated by means of the instruction MSR_SPSR.

The operation MRS (move to register from status register), which reads the register CPSR needs to reconstruct the information content of the CPSR itself, which in this implementation is distributed between the ARM_CPSR and the four registers of the flags RC, RN, RZ, RV.

The instruction supports conditional execution.

The operation MRS (move to register from status register), which reads the register SPSR of the current mode must first read the register CPSR to identify the current mode, and its execution has an unforeseeable result in the User and System modes, which do not have an register SPSR.

In addition to the instructions already described, the ARM processor has other special instructions:

BKPT (software breakpoint);

SWI (software interrupt);

instructions for the management of the coprocessors (load from coprocessor, store to coprocessor, coprocessor data processing, etc.)

The software-breakpoint instruction only is used by an ARM processor only in the debugging step, and for this reason must not be present in any executable file. Consequently, like all the opcodes that are not defined, this instruction has been translated on the LX processor in a system call of the Illegal-Instruction type.

The operations on the coprocessors have been treated in the same way, the complete emulation of a hardware system based upon the ARM processor not being among our current targets.

The software interrupts enable the ARM processor to interact with the hardware of the system and can be translated in three ways:
- as Illegal Instruction, if the aim is not to emulate the hardware of the system;
- as jump to a special ARM exception handler written for the LX processor, which handles the system call of the LX processor corresponding to the software interrupt service invoked by the ARM processor. This solution may be implemented in the step of development of the mixed ARM-LX system for verifying proper execution of the programs;
- if the code of all the exception handlers and the contents of the interrupt vectors are available, the instruction SWI may be translated simply as switch to the Supervisor mode of the ARM processor and jump with link to the interrupt vector. The operations of management of the status and of saving and restoring the registers are in fact present explicitly in the ARM code and are not provided by the opcode SWI. This choice enables emulation of a complete system based upon the ARM processor, but to function properly needs a memory system that provides a partition between ARM memory and LX memory, in which in the ARM memory there will be mapped the peripherals of the ARM processor that do not have an equivalent in the LX system and in which the accesses to peripherals already present in the LX system are re-addressed to the corresponding memory locations of the LX processor.

From what has been described above, it is evident that the translation of the opcodes of the ARM processor on the LX processor has a heavy impact on the performance of the system, for example in the translation of a data-processing instruction that does not modify the status register.

For each ARM instruction belonging to this category, there are necessary at least four bundles of the LX processor; hence, given the same clock frequency, execution of the ARM code on the LX processor is four times slower.

There is a further deterioration for the instructions of multiplication, access to memory, and jumps.

From an analysis of the execution of some benchmarks written in ARM code, some important observations can be made:
- the data-processing operations are on average 50% of the total of the instructions executed;
- over 90% of the instructions do not exploit the conditional execution;
- of the data-processing operations, approximately 90% are divided into two addressing modes: the direct-from-register mode and the non-rotated-from-immediate mode;
- of the data-processing operations, fewer than 20% require modification of the status register CPSR;
- the instructions that modify the register CPSR are, in the majority of cases, compare operations (CMN, CMP), or logic-test operations (TST, TEQ).

As a result of the above, it is convenient to complicate slightly the decoding step to add purposely designed translations for the most widely used instructions.

This mode of fast translation can be applied when, amongst the operands of the instruction, there is not present the program counter of the ARM processor.

A non-conditional data-processing instruction, if it does not modify the status register, is translated as follows:
if the addressing is direct from register

| ARM instruction | LX translation |
|---|---|
| ORR@@ Rdest, Rsorg1, @@@ | Rdest=Rsorg1\|Rsorg2 |
| | ARM_PC=ARM_PC+4 | if the addressing is from non-rotated immediate

| ARM instruction | LX translation |
|---|---|
| ORR Rdest,Rsorg1, #short_imm | Rdest = Rsorg1 \| #short_imm |
| | ARM PC = ARM_PC + 4 |

A non-conditional logic-test or compare instruction is translated as follows:
if the addressing is direct from register

| ARM instruction | LX translation |
|---|---|
| CMP Rsorg1, Rsorg2 | Rdest = Rsorg1 − Rsorg2 |
| | $Condition = = 1 |
| | ARM PC = ARM_PC + 8 |
| | Commitment | if the addressing is from non-rotated immediate

| ARM instruction | LX translation |
|---|---|
| CMP Rsorg, #short_imm | Rt_dest = Rsorg − #short_imm |
| | Rshift_op = #short_imm |
| | $Condition = 1 |
| | ARM_PC = ARM_PC + 8 |
| | Commitment |

The commitment step takes place exactly as described in the previous paragraph, and it is for this reason that the branch-bit condition is brought to one and ARM_PC is increased by eight.

With this modification, the majority of the data-processing instructions may be executed in a single bundle.

The solution just described enables considerable advantages to be achieved as compared to the known solutions.

It will be appreciated that the main advantage of the solution described above derives from the fact that the introduction of an external translator device enables the core of the LX microprocessor to be left unaltered. Said translator device, when it needs to access the resources of the core of the LX microprocessor, does not access it directly, but incorporates into the translation of the ARM instruction conditional constructs based upon the contents of the registers or of the branch bits of the core of the LX microprocessor.

Moreover, advantageously the translator device enters into action autonomously, recognizing the accesses to the storage area reserved to the ARM code.

Persons skilled in the sector will appreciate that the solution described herein with specific reference to the translation of ARM instructions into ST-200 LX instructions is in actual fact applicable to a wider field of use, i.e., to the translation of the instructions of a pipelined scalar microprocessor having characteristics that in any case correspond to the characteristics of an ARM processor into instructions for a microprocessor of the VLIW type, which has characteristics that in any case correspond to the characteristics of an LX processor. It is noted that the solution described is applicable also to a superscalar processor, which supports renaming and out-of-order execution, thus rendering possible excellent performance even on not perfectly optimized translations.

The pipelined scalar processor instructions and the VLIW instructions identify in general all the processes that involve instruction-set architectures (ISAs) that are equivalent to the ones described herein.

All of the above U.S. patents, U.S. patent application publications, U.S. patent applications, foreign patents, foreign patent applications and non-patent publications referred to in this specification and/or listed in the Application Data Sheet are incorporated herein by reference, in their entirety.

Of course, without prejudice to the principle of the invention, the details of implementation and the embodiments may vary widely with respect to what is described and illustrated herein, without thereby departing from the scope of the present invention, as defined in the annexed claims.

The invention claimed is:

1. A process for translating instructions belonging to a first set of instructions that are pipelined scalar processor instructions into instructions belonging to a second set of instructions that are VLIW processor instructions for execution on a VLIW processor that includes a core, said process comprising the following operations:
providing a first set of registers corresponding to the instructions of said first set of instructions;
providing a second set of registers corresponding to the instructions of said second set of instructions;
mapping each register of said first set of registers in a corresponding register of said second set of registers designed to emulate the behavior of the register of said first set of registers, performing a unique independent translation of the instructions of said first set of instructions into said second set of instructions;
said operations of providing the second set of registers and of mapping being obtained by adding functional units to VLIW processor and keeping said core unaltered; and
performing said translation in the absence of direct access to resources of said core.

2. The process according to claim 1, wherein adding functional units includes adding a translation device external to said core of the VLIW processor,
said translation device intercepting accesses to a storage area reserved to the first set of instructions.

3. The process according to claim 2, further comprising forcing a program counter of the VLIW processor to point to a translation memory reserved in the translation device for containing a translation of an instruction belonging to the first set of instructions, and decoding the instruction into a decoded instruction.

4. The process according to claim 3, further comprising loading in said translation memory all instructions that constitute the translation of the decoded instruction.

5. The process according to claim 4, further comprising associating said all instructions that constitute the translation of the decoded instruction to a jump-to-link to a next instruction of the first set of instructions to be executed, so that all instructions of the first set of instructions that are not directly mappable to instructions of the second set of instructions entail a jump to the translation memory and the jump-to-link for loading the next instruction of the first set of instructions.

6. The process according to claim 1, further comprising translating all instructions of the first set of instructions to which there does not correspond an equivalent single instruction in the second set of instructions into an unconditioned GOTO jump.

7. The process according to claim 1, further comprising an operation of forcing a program counter of the VLIW processor to operationally emulate a program counter of a pipelined scalar processor.

8. The process according to claim 7, wherein said operation of forcing the program counter of the VLIW processor includes forcing said program counter of the VLIW processor to contain a value that is the value of the program counter of the pipelined scalar processor upon loading an instruction belonging to the first set of instructions.

9. The process according to claim 8, further comprising executing one translated instruction and ending the executing by performing a jump to an address of a next instruction belonging to the first set of instructions.

10. The process according to claim 9, wherein emulating the program counter of the pipelined scalar processor includes using a counter register, incrementing said counter register so that each instruction that accesses said counter register during the execution step will have a behavior that is coherent with the program counter on the pipelined scalar processor, and decrementing said counter register for pointing to the next instruction belonging to the first set of instructions.

11. The process according to claim 10, wherein said counter register is incremented by a value eight and decremented subsequently by a value four.

12. The process according to claim 11, wherein, for instructions belonging to the first set of instructions that have the program counter of the VLIW processor as a destination, a pointing to the next instruction belonging to the first set of instructions is obtained by loading into a link register of the VLIW processor an updated value of the counter register and by making an unconditioned GOTO link jump.

13. The process according claim 1 wherein adding functional units includes adding a translation device external to said core of the VLIW processor, said translation device intercepting accesses to a storage area reserved to the first set of instructions, the process further comprising allowing a program counter of the VLIW processor to evolve freely in the absence of jumps.

14. The process according to claim 13, wherein said translation device is designed to execute operations of intercepting accesses to the storage area reserved to the first set of instructions and controlling a set of pointer registers for deciding whether to execute subsequent instructions as instructions of the second set of instructions or as instructions of the first set of instructions.

15. The process according to claim 14, wherein said translation device is inactive until the core of the VLIW processor executes instructions belonging to said second set of instructions and refers an accesses-to-memory to an instruction cache memory, and said translation device is activated when there is an access to the storage area reserved to the first set of instructions.

16. The process according to claim 15, wherein when said translation device is activated, the translation device loads into a selected one of its internal registers belonging to the set of pointer registers an address which is accessed and carries out reading of a corresponding instruction from the storage area.

17. The process according to claim 16, further comprising the operations of: translating said corresponding instruction read from the storage area and storing said corresponding instruction;
- allocating an execution window, to which are referred all accesses to memory addresses that start from a current value of the program counter of the VLIW processor and cover an area equal to one occupied by the translation;
- reading, using the core of the VLIW processor, a first instruction of the translation from the storage area reserved to the first set of instructions in the translation device;
- incrementing a selected register by a value four, to point to the next instruction of the first set of instructions; and
- closing said execution window after reading a last instruction of the translation, and, if at a next access to memory the selected register points outside the storage area reserved to the first set of instructions, deactivating the translation device.

18. The process according to claim 17, further comprising, in the presence of jumps in a program consisting of instructions of the first set of instructions, rewriting said selected register by a store-word operation contained in the translation of an instruction of the first set of instructions into instructions of the second set of instructions.

19. The process according to claim 1 wherein the operation of translation on the VLIW processor starts with verification of an execution condition, which includes evaluating one or more flags present in a status register.

20. A translator device for translating instructions belonging to a first instruction set that are pipelined scalar processor instructions into instructions belonging to a second instruction set that are VLIW processor instructions for execution on a VLIW processor that includes a core, said translation device comprising
- a translation subsystem designed to receive at input a instruction of the first instruction set and supply at output a translation including one or more instructions of the second instruction set;
- a translation memory coupled to the translation subsystem and structured to store said translation; and
- a control device for taking said translation from said translation memory and supplying it to the core of said VLIW processor, wherein the device is connected between the core of said VLIW processor and an instruction-cache memory of said VLIW processor, which operates on a first memory containing instructions of the first instruction set and a second memory containing instructions of the second instruction set, and wherein the control device intercepts accesses of the core of the VLIW processor to said first and second memories.

21. The device according to claim 20, wherein said translation subsystem operates based on a code table stored in said translation memory.

22. The device according to claim 20, further comprising a set of pointer registers at least in part designed for controlling access to said memories.

23. A computer-readable medium having contents that, when loaded into a computer, cause the computer to perform a process for translating instructions belonging to a first set of instructions that are pipelined scalar processor instructions into instructions belonging to a second set of instructions that are VLIW processor instructions for execution on a VLIW processor that includes a core, said process comprising the following operations:
- providing a first set of registers corresponding to the instructions of said first set of instructions;
- providing a second set of registers corresponding to the instructions of said second set of instructions;
- mapping each register of said first set of registers in a corresponding register of said second set of registers designed to emulate the behavior of the register of said first set of registers, performing a unique independent translation of the non-native instructions of said first set of instructions into said second set of instructions;
- said operations of providing a second set of registers and of mapping being obtained by adding functional units to the VLIW processor and keeping said core unaltered; and
- performing said translation in the absence of direct access to resources of said core.

24. The process according to claim 23, wherein emulating a program counter of the pipelined scalar processor includes using a counter register, incrementing said counter register so that each instruction that accesses said counter register during the execution step will have a behavior that is coherent with a program counter on a pipelined scalar processor, and decrementing said counter register for pointing to the next instruction belonging to the first set of instructions.

25. The process according to claim 24, wherein said counter register is incremented by a value eight and decremented subsequently by a value four.

26. The process according to claim 16, further comprising the operations of: translating said corresponding instruction read from the storage area and storing said corresponding instruction;
- allocating an execution window, to which are referred all accesses to memory addresses that start from a current value of the program counter of the VLIW processor and cover an area equal to one occupied by the translation;
- reading, using the core of the VLIW processor, a first instruction of the translation from the storage area reserved to the first set of instructions in the translation device;
- incrementing a selected register by a number equal to a length in bytes of each instruction of the first set of instructions; and
- closing said execution window after reading a last instruction of the translation, and, if at a next access to memory the selected register points outside the storage area reserved to the first set of instructions, deactivate the translation device.

27. A process for translating instructions belonging to a first set of instructions that are pipelined scalar processor instructions into instructions belonging to a second set of instructions that are VLIW processor instructions for execution on a VLIW processor that includes a core, said process comprising the following operations:
- providing a first set of registers corresponding to the instructions of said first set of instructions;
- providing a second set of registers corresponding to the instructions of said second set of instructions;
- mapping each register of said first set of registers in a corresponding register of said second set of registers designed to emulate the behavior of the register of said first set of registers, performing a unique independent translation of the instructions of said first set of instructions into said second set of instructions;

said operations of providing the second set of registers and of mapping being obtained by adding functional units to VLIW processor and keeping said core unaltered; and performing said translation in the absence of direct access to resources of said core;

wherein adding functional units includes adding a translation device external to said core of the VLIW processor, said translation device intercepting accesses to a storage area reserved to the first set of instructions, the process further comprising allowing a program counter of the VLIW processor to evolve freely in the absence of jumps;

translating said corresponding instruction read from the storage area and storing said corresponding instruction;

allocating an execution window, to which are referred all accesses to memory addresses that start from a current value of the program counter of the VLIW processor and cover an area equal to one occupied by the translation;

reading, using the core of the VLIW processor, a first instruction of the translation from the storage area reserved to the first set of instructions in the translation device;

incrementing a selected register by a number equal to a length in bytes of each instruction of the first set of instructions; and closing said execution window after reading a last instruction of the translation, and, if at a next access to memory the selected register points outside the storage area reserved to the first set of instructions, deactivate the translation device.

28. The process according to claim 27, further comprising, in the presence of jumps in a program consisting of instructions of the first set of instructions, rewriting said selected register by a store-word operation contained in the translation of an instruction of the first set of instructions into instructions of the second set of instructions.

29. The process according to claim 27, wherein said translation device is designed to execute operations of intercepting accesses to the storage area reserved to the first set of instructions and controlling a set of pointer registers for deciding whether to execute subsequent instructions as instructions of the second set of instructions or as instructions of the first set of instructions.

30. The process according to claim 29, wherein said translation device is inactive until the core of the VLIW processor executes instructions belonging to said second set of instructions and refers an accesses-to-memory to an instruction cache memory, and said translation device is activated when there is an access to the storage area reserved to the first set of instructions.

* * * * *